US012659544B2

(12) United States Patent
Middleton et al.

(10) Patent No.: US 12,659,544 B2
(45) Date of Patent: Jun. 16, 2026

(54) SECURE ENHANCEMENT DECODING WITHIN PROTECTED EXECUTION ENVIRONMENTS

(71) Applicant: V-NOVA INTERNATIONAL LIMITED, London (GB)

(72) Inventors: Colin Middleton, London (GB); James Maddison, London (GB); John Little, London (GB); Daniele Sparano, London (GB)

(73) Assignee: V-NOVA INTERNATIONAL LIMITED, London (GB)

( * ) Notice: Subject to any disclaimer, the term of this patent is extended or adjusted under 35 U.S.C. 154(b) by 0 days.

(21) Appl. No.: 18/728,722

(22) PCT Filed: Jan. 11, 2023

(86) PCT No.: PCT/GB2023/050050
§ 371 (c)(1),
(2) Date: Jul. 12, 2024

(87) PCT Pub. No.: WO2023/135420
PCT Pub. Date: Jul. 20, 2023

(65) Prior Publication Data
US 2024/0430517 A1     Dec. 26, 2024

(30) Foreign Application Priority Data

Jan. 12, 2022     (GB) ...................................... 2200362
Nov. 1, 2022     (GB) ...................................... 2216236

(51) Int. Cl.
H04N 21/4385     (2011.01)
H04N 19/33     (2014.01)
H04N 21/2343     (2011.01)

(52) U.S. Cl.
CPC ....... *H04N 21/43856* (2013.01); *H04N 19/33* (2014.11); *H04N 21/234327* (2013.01)

(58) Field of Classification Search
CPC ............. H04N 21/43856; H04N 19/33; H04N 21/234327
See application file for complete search history.

(56) References Cited

U.S. PATENT DOCUMENTS 6,957,350 B1     10/2005  Demos
8,751,565 B1 *    6/2014  Jia ............................. G06F 9/54
                                                        709/201
(Continued)

FOREIGN PATENT DOCUMENTS

GB          2607123  A      11/2022
WO     2006/129222 A2     12/2006
(Continued)

OTHER PUBLICATIONS

International Search Report and Written Opinion received for PCT Patent Application No. PCT/GB2023/050050, mailed on Jun. 14, 2023, 20 pages.
(Continued)

*Primary Examiner* — Mohamed A. Wasel
(74) *Attorney, Agent, or Firm* — Workman Nydegger

(57) ABSTRACT

Techniques for securely decoding video streams are disclosed. A secure execution space is established within a device to manage decryption, decoding, and enhancement operations without exposing protected content to non-secure components. Encrypted base video data is decrypted and decoded on protected resources, while enhancement data is decoded by an enhancement decoder. The decoded enhancement data is combined with the base decoded signal within the secure environment to produce a final enhanced output. The approach provides efficient enhancement decoding and (Continued)

secure playback of premium content across a range of devices and platforms.

19 Claims, 10 Drawing Sheets

(56) References Cited

U.S. PATENT DOCUMENTS

| | | | | |
|---|---|---|---|---|
| 8,971,532 | B1 * | 3/2015 | Milstein | H04N 21/44055 713/176 |
| 10,567,804 | B2 * | 2/2020 | Chen | H04N 21/2401 |
| 2007/0100771 | A1 * | 5/2007 | Eckleder | G06Q 20/3674 705/67 |
| 2008/0043832 | A1 * | 2/2008 | Barkley | H04N 19/33 375/240 |
| 2011/0064220 | A1 | 3/2011 | Chen et al. | |
| 2015/0281186 | A1 | 10/2015 | Smith et al. | |
| 2015/0341644 | A1 * | 11/2015 | Narasimhan | H04N 21/44004 375/240.02 |
| 2015/0347442 | A1 * | 12/2015 | Lawrence | G06F 16/1744 707/692 |
| 2016/0044346 | A1 * | 2/2016 | Braness | H04L 63/0428 380/210 |
| 2016/0070887 | A1 * | 3/2016 | Wu | H04N 21/44055 713/189 |
| 2016/0277769 | A1 * | 9/2016 | Sadhwani | H04N 19/127 |
| 2016/0364551 | A1 * | 12/2016 | Bouazizi | H04N 21/63345 |
| 2017/0109503 | A1 * | 4/2017 | Mangalore | H04L 9/065 |
| 2020/0288176 | A1 * | 9/2020 | Narasimhan | H04N 19/127 |
| 2021/0297681 | A1 | 9/2021 | Clucas et al. | |

FOREIGN PATENT DOCUMENTS

| | | | |
|---|---|---|---|
| WO | WO 2016/040536 | A1 | 3/2016 |
| WO | WO 2022/243672 | A1 | 11/2022 |
| WO | 2023/073365 | A1 | 5/2023 |

OTHER PUBLICATIONS

Invitation to Pay Additional Fees received for PCT Patent Application No. PCT/GB2023/050050, mailed on Apr. 24, 2023, 14 pages.

Office Action received for Great Britain Patent Application No. 2216236.6, mailed on May 3, 2024, 6 pages.

V-Nova Services Ltd: "LCEVC Software Overview", slides given Nov. 6, 2021 Retrieved from the Internet: URL: https://member.dvb.org/wg/CM-AVC/documentRevision/download/45762, Downloaded Apr. 1, 2021, 9 pages.

International Search Report for application No. PCT/GB2023/050050.

Written Opinion of the International Searching Authority for application No. PCT/GB2023/050050.

* cited by examiner

*1000*

Receiving a video stream comprising an encoded base video signal and an associated enhancement signal — *1010*

Identifying that playback of the video stream will be problematic when applying enhancement to the base video signal — *1020*

Instructing the video stream to be processed using a native video player based on the identifying — *1030*

SECURE ENHANCEMENT DECODING WITHIN PROTECTED EXECUTION ENVIRONMENTS

CROSS-REFERENCE TO RELATED APPLICATIONS

This application is a 371 US Nationalization of International Application No. PCT/GB2023/050050, filed Nov. 1, 2023, which claims priority from GB Patent Application No: 2200362.8, filed Dec. 1, 2022 and GB Patent Application No: 2216236.6, filed Jan. 11, 2022, the disclosures of which are hereby incorporated herein by reference in their entirety.

BACKGROUND

A hybrid backward-compatible coding technology has been previously proposed, for example in WO 2014/170819 and WO 2018/046940, the contents of which are incorporated by reference herein in their entirety. Further examples of tier-based coding formats include ISO/IEC MPEG-5 Part 2 LCEVC (hereafter "LCEVC"). LCEVC has been described in WO 2020/188273A1, and the associated standard specification documents including the Text of ISO/IEC 23094-2 Ed 1 Low Complexity Enhancement Video Coding published in November 2021, both documents being incorporated by reference herein in their entirety.

In these coding formats a signal is decomposed in multiple "echelons" (also known as "hierarchical tiers") of data, each corresponding to a "Level of Quality", from the highest echelon at the sampling rate of the original signal to the lowest echelon. The lowest echelon is typically a low quality rendition of the original signal and other echelons contain information on correction to apply to a reconstructed rendition in order to produce the final output.

LCEVC adopts this multi-layer approach where any base codec (for example Advanced Video Coding-AVC, also known as H.264, or High Efficiency Video Coding-HEVC, also known as H.265) can be enhanced via an additional low bitrate stream. LCEVC is defined by two component streams, a base stream typically decodable by a hardware decoder and an enhancement stream consisting of one or more enhancement layers suitable for software processing implementation with sustainable power consumption. The enhancement provides improved compression efficiency to existing codecs, and reduces encoding and decoding complexity.

Since LCEVC and similar coding formats leverage existing decoders and are inherently backwards-compatible, there exists a need for efficient and effective integration with existing video coding implementations without complete re-design. Examples of known video coding implementations include the software tool FFmpeg, which is used by the simple media player FFplay.

LCEVC is not limited to known codecs and is theoretically capable of leveraging yet-to-be-developed codecs. As such any LCEVC implementation should be capable of integration with any hitherto known or yet-to-be-developed codec, implemented in hardware or software, without introducing coding complexity.

The approach of LCEVC being a codec agnostic enhancer based on a software-driven implementation, which leverages available hardware acceleration, also shows in the wider variety of implementation options on the decoding side. While existing decoders are typically implemented in hardware at the bottom of the stack, LCEVC basically allows for implementation on a variety of levels i.e. from Scripting and Application to the OS and Driver level and all the way to the SoC and ASIC. In other words, there is more than one solution to implement LCEVC on the decoder side. Generally speaking, the lower in the stack the implementation takes place, the more device specific the approach becomes. Except for an implementation on ASIC level, no new hardware is needed. This does create challenges with regard to security, especially with a view to premium content and the resulting requirements. Embodiment of the present invention aim to overcome such challenges, especially in relation to secure decoding of protected (e.g. premium) content.

SUMMARY OF THE INVENTION

According to a first aspect of the invention there may be provided a method of implementing enhancement decoding, comprising: creating one or more source buffers to receive an encoded video stream, the encoded video stream comprising an encrypted base video signal and an enhancement video signal; in a secure execution space, creating one or more protected input buffers and one or more protected output buffers to receive decrypted data; passing the one or more source buffers and the one or more protected input buffers to a decryption module to decrypt the encrypted base video signal and store the decrypted base video signal in the one or more protected input buffers; passing the one or more protected input buffers to a base decoder to implement a base decoding layer to decode the decrypted base video signal; passing the one or more source buffers to the secure execution space for decoding the enhancement video signal using an enhancement decoder.

The method modifies the media framework of an existing operating system to allow both encrypted and decrypted video signals to be passed to a secure version of the media framework, i.e. the secure execution space. As such, protected (e.g. premium) content is not exposed to unprotected resources and may be securely processed. The secure execution space fits into existing frameworks implementing enhanced coding by using security primitives provided by the operating system. Further, the framework modifications needed to implement the secure execution space are minimal, which reduces maintenance costs over time.

In some implementations, the decryption block may be referred to as a Crypto Block.

In further, optional examples the base decoding layer is implemented to decode the decrypted base video signal on protected resources. The protected resources are protected in the sense that they are typically only accessible by secure hardware of the base decoding layer.

The enhancement video signal may comprise an encoded signal comprising one or more layers of residual data, the one or more layers of residual data being generated based on a comparison of data derived from a decoded video signal and data derived from an original input video signal.

Optionally the base decoder may decode the decrypted base video signal into a protected base output buffer, and the method further comprises: passing the base decoded video signal to a decoder integration layer using the base output buffer.

Preferably, the method may further comprise setting a protected content flag on the base output buffer.

By setting a protected content flag on the base output buffer, it may be ensured that the base output buffer can only be processed by secure hardware. Specifically, the flag may prevent non-secure hardware from accessing the output buffer, since the flag is incompatible with read and write flags of non-secure hardware such as a CPU or a video encoder.

In preferred embodiments, the source buffers are unprotected source buffers. For completeness, unprotected source buffers are CPU accessible such that enhancement decoding can be performed by the CPU on unprotected resources.

Further, in some optional embodiments, the encoded video stream comprises an unencrypted enhancement video signal. Using an unencrypted enhancement video signal facilitates decoding using the CPU. However, the enhancement video signal may alternatively be encrypted.

In an optional implementation, the unencrypted enhancement video signal may be stored in supplemental enhancement information network abstraction layer units, SEI NALUs. However, the unencrypted enhancement video signal may also be stored in a different NALU stream.

The base decoder may be a native base decoder.

Optionally the secure execution space may be an instance of a secure plugin.

In some advantageous implementations, the secure plugin is an open media acceleration, OMX, plugin. Modifying the OMX plugin allows for secure playback of projected (e.g. premium) content on Android devices. This makes the method of the present disclosure widely applicable to devices running an Android OS, such as mobile phones/tablets, televisions and set-top boxes.

Additionally, the secure execution space may provide a wrapper for the base decoding layer and an instance of an enhancement decoder.

In some examples, the enhancement decoder may be provided by an instance of a decoder integration layer to control operation of the enhancement decoder.

In certain examples, the enhancement decoder may be implemented on a CPU to decode the enhancement signal using unprotected resources.

The method may further comprise uploading, in the environment of the decoder integration layer, decoded enhancement data to a GPU for combining with the decoded base video signal on protected resources. Thus, when the enhancement signal and the base video signal are combined, neither is exposed to non-secure hardware.

In some examples the method may further comprise outputting a combined signal comprising decoded enhancement data and decoded base video signal on an on-screen surface or preparing an enhanced frame comprising the combined signal for subsequent rendering on an on-screen surface.

Additionally, the method may further comprise creating an instance of the secure execution space comprising an instance of a base decoder and an instance of a decoder integration layer comprising an enhancement decoder.

In some examples, the enhancement decoder may implement an enhancement decoding layer, and may be configured to: receive an encoded enhancement signal; and, decode the encoded enhancement signal to obtain one or more layers of residual data, the one or more layers of residual data being generated based on a comparison of data derived from a decoded video signal and data derived from an original input video signal.

Further, the method may comprise extracting the enhancement signal from the encoded video stream to separate the enhancement signal from the encrypted base video signal.

The methods may be performed together with a decoder integration layer which controls operation of one or more decoder plug-ins and an enhancement decoder to generate a decoded reconstruction of the original input video signal using a decoded video signal from a base encoding layer and one or more layers of residual data from the enhancement encoding layer, wherein the one or more decoder plug-ins provide a wrapper for one or more respective base decoders to implement a base decoding layer to decode an encoded video signal, each wrapper implementing an interface for data exchange with a corresponding base decoder and wherein the enhancement decoder implements the enhancement decoding layer, the enhancement decoder being configured to:

receive an encoded enhancement signal; and, decode the encoded enhancement signal to obtain the one or more layers of residual data.

Preferably the enhancement decoder is an LCEVC decoder and more preferably the decoder integration layer, one or more plug-ins and the enhancement decoder together provide an LCEVC decoding software solution. The LECVC decoding software stack may be implemented in one or more LCEVC decoder libraries and thus provides an optimised software library for decoding MPEG-5 enhanced streams.

LCEVC decoding is extremely lightweight, often freeing up resources and matching or reducing battery power consumption vs. native base codec decoding. The approaches provides for rapid deployment of LCEVC across all platforms, including support of different base encodings and decoder implementations.

The decoder integration layer may also include control operation of an upscale operation to upscale the decoded video signal from the base encoding layer so that the one or more layers of residual data may be applied to the decoded video signal from the base encoding layer.

The decoder can be easily implemented on popular media players across platforms such as iOS®, Android® and Windows®.

The one or more decoder plug-ins may be configured to instruct the corresponding base decoder through a library function call or operating system function call. Function calls may include for example, Android® mediacodec, VTDecompressionSession and MFT depending on the operating system. Hence, different base decoding implementations may be easily supported, including native implementations within an operating system and hardware-accelerated decoding.

The decoder integration layer may be configured to apply the one or more layers of residual data from the enhancement encoding layer to the decoded video signal from the base encoding layer to generate the decoded reconstruction of the original input video signal. In certain cases, the decoder integration layer may instruct a plug-in from the set of decoder plug-ins to apply the one or more layers of residual data; in other cases, the decoder integration layer may obtain a decoded output from the base encoding layer that was instructed using the decoder plugin and combine this with the output of the enhancement decoder. Preferably the layers of residual data may be applied during playback.

In certain embodiments the decoder integration layer is configured to receive: one or more input buffers comprising the encoded video signal and the encoded enhancement signal in an encoding order, wherein the one or more input buffers are also fed to the base decoders; and, one or more base decoded frames of the decoded video signal from the base encoding layer, in presentation order. In this way minimal processing is needed by a client and the integration takes care of the operation for the client. The same input buffers can be passed to the base decoding layer and the enhancement decoding layer to aid simplicity.

In particularly preferred embodiments, the control interface comprises an output type configuration parameter, wherein the decoder integration layer is configured to vary how the decoded reconstruction of the original input video signal is output based on a value of the output type configuration parameter. The value of the output type configuration parameter may be stored in a configuration data structure retrieved by the decoder integration layer upon initialisation.

In one example of a configured output, the decoder integration layer is configured to output the decoded reconstruction of the original input video signal as one or more buffers. In another example, the decoder integration layer is configured to output the decoded reconstruction of the original input video signal as one or more on-screen surfaces. Alternatively, the decoder integration layer is configured to output the decoded reconstruction of the original input video signal as one or more off-screen textures. Each of these three example outputs may be selected by the output type configuration parameter.

Where the output is selected to be one or more off-screen textures, the control interface may comprise a render instruction and, when the decoder integration layer receives the render instruction the decoder integration layer may be configured to render the off-screen texture. This is particularly useful when a client wants to finely manage the time of display of each frame and perhaps keep a queue of decoded frames ready for display at the right time. For this use, a separate render function is provided, that is, the render instruction.

The control interface may comprise a pipeline mode parameter, wherein the decoder integration layer is configured to control stages of the enhancement layer to be performed on a central processing unit (CPU) or graphical processing unit (GPU) based on a value of the pipeline mode parameter. For example, in one pipeline mode all the LCEVC stages may be performed in a CPU while a GPU is used only for a possible colour component (e.g. YUV/RGB) conversion. Similarly, in another mode, most of the LCEVC stages may be performed in a GPU using graphics library (GL) shaders, including colour component (e.g. YUV/RGB) conversions, while the CPU may be only used to produce the LCEVC residual planes. The configuration of the present decoder allows efficient distribution of processing across CPUs/GPUs, and for this to be configured via the decoder integration layer.

The decoder integration layer may be configured to fall back to passing an output of the base decoding layer as the decoded reconstruction of the original input video signal where no encoded enhancement signal is received. This is particularly beneficial as a video signal may still be output, albeit at a lower resolution than if an enhancement signal had been received successfully.

The control interface may comprise a skip frame instruction and the decoder integration layer may be configured to control the operation to not decode a frame of the encoded enhancement signal and/or not decode a frame of the encoded video signal in response to receiving the skip frame instruction. When a client skips frames, for example, because of a seek in the timeline, or drops frames because they are 'late,' it may alert the decoder integration layer using a suitable function. The decoder integration layer falls back to a 'no operation' case if the skip instruction is received. This alert may be used to internally perform a minimal frame decoding to keep reference decoding buffer consistent or may fall back to no operation.

The one or more decoder plug-ins may provide a base control interface to the base decoder layer to call functions of the corresponding base decoder. The plug-ins thus provide an application programming interface (API) to control operations and exchange information.

The control interface may comprise a set of predetermined encoding options, wherein the decoder integration layer is configured to retrieve a configuration data structure comprising a set of decoding settings corresponding to the set of predetermined decoding options. The configuration data structure may be retrieved by the decoder integration layer upon initialisation. Examples of decoding settings include: graphics library versions (e.g. OpenGL major and minor versions or the use of graphics library functions for embedded systems such as OpenGL ES); bit-depth, e.g. use of 8 or 16 bit LCEVC residual planes; use of hardware buffers; user interface (UI) configurations (e.g. enabling an on-screen UI for stats and live configuration); and logging (e.g. enabling dumping stats and/or raw output frames to local storage).

In certain embodiments, the decoder integration layer may be configured to receive, via the control interface, an indication of a mode in which the decoder integration layer should control operation of the one or more decoder plug-ins and the enhancement decoder, wherein, in a synchronous mode, the decoder integration layer may be configured to block a call to a decode function until decoding is complete; and, in an asynchronous mode, the decoder integration layer may be configured to return (e.g. immediately) upon call to a decode function and call back when decoding completes. Thus, the decoder integration layer can be used in either synchronous or asynchronous mode, optionally by implementing a decode function in either mode.

Using the decoder integration layer is simplified for client applications, since the control interface operates at a relatively high-level, has a small number of commands and hides additional complexity. The control interface may comprise a set of functions to instruct respective phases of operation of the decoder integration layer, the set of functions comprising one or more of: a create function, in response to which an instance of the decoder integration layer is created; a destruct function, in response to which the instance of the decoder integration layer is destroyed; a decode function, in response to which the decoder integration layer controls operation of the one or more decoder plug-ins and the enhancement decoder to generate a decoded reconstruction of the original input video signal using and the one or more layers of residual data from the enhancement encoding layer; a feed input function which passes an input buffer comprising the encoded video signal and the encoded enhancement signal to the video decoder; and, a call back function, in response to which the decoder integration layer will call back when the decoded reconstruction of the original input video signal is generated. The call back may be thought of as a registered for alert which indicates to a client that the decoding is complete.

According to a second aspect of the invention there may be provided a method of implementing an enhancement decoding in a secure execution space, comprising: receiving a decrypted base video signal in one or more protected input buffers allocated by a base decoder; sending the decrypted base video signal to an instance of a base decoder via the one or more protected input buffers; receiving one or more source buffers comprising an encoded video stream, the encoded video stream comprising an encrypted base video signal and an enhancement video signal; extracting and decoding, by an instance of an enhancement decoder, the enhancement video signal to obtain one or more layers of residual data, the one or more layers of residual data being generated based on a comparison of data derived from a decoded video signal and data derived from an original input video signal; and receiving, from the instance of the base decoder, a decoded rendition of the base video signal.

Some examples may further comprise instructing combination of the one or more layers of residual data with the decoded base video signal stored in one or more protected base output buffers by the base decoder.

According to a third aspect of the invention there may be provided a video decoder comprising: one or more source buffers to receive an encoded video stream, the encoded video stream comprising an encrypted base video signal and an enhancement video signal; a secure execution space configured to create one or more protected input buffers and one or more protected output buffers wherein the one or more protected output buffers are configured to receive decrypted data; a decryption module configured to: receive one or more source buffers and the one or more protected input buffers; decrypt the encrypted base video signal; and store the decrypted base video signal in the one or more protected input buffers; and a base decoder configured to: receive the one or more protected input buffers; and implement a base decoding layer to decode the decrypted base video signal; and the secure execution space is further configured to: receive the one or more source buffers; and decode the enhancement video signal using an enhancement decoder.

According to a fourth aspect of the invention there may be provided a video decoder comprising a secure execution space, wherein the secure execution space comprises a base decoder configured to allocate one or more protected input buffers, the protected input buffers configured to receive a decrypted base video signal, wherein an instance of the base decoder is configured to receive the decrypted base video signal via the one or more protected input buffers; the video decoder is configured to receive one or more source buffers comprising an encoded video stream, the encoded video stream comprising an encrypted base video signal and an enhancement video signal; the secure execution space further comprises an instance of an enhancement decoder configured to extract and decode the enhancement video signal to obtain one or more layers of residual data, the one or more layers of residual data configured to be generated based on a comparison of data derived from a decoded video signal and data derived from an original input video signal; and the instance of the base decoder, is configured to receive a decoded rendition of the base video signal.

In some examples the video decoder may be further configured to instruct combination of the one or more layers of residual data with the decoded base video signal stored in one or more protected base output buffers by the base decoder.

According to a further aspect there may be provided a computer readable medium comprising instructions which when executed by a processor, cause the processor to perform the method according to any of the above aspects.

According to a further aspect there may be provided a video decoding system, comprising: a video decoder according to the above aspects; and, one or more base decoders. Examples of the one or more base codecs include, for example, AVC, HEVC, VP9, EVC, AV1 and may be implemented in software or hardware as is commonplace in this field.

The video decoding system may further comprise a client which provides one or more calls to the video decoder via the control interface to instruct generation of a decoded reconstruction of an original input video signal using the video decoder.

In further advantageous examples, the method may further comprise: identifying if playback of the encoded video stream will be problematic when applying enhancement to the base video signal; when playback is identified as problematic: instructing the video stream to be processed using a native video player; when playback is identified as not problematic, perform the steps of: passing the one or more source buffers and the one or more protected input buffers to the decryption module; passing the one or more protected input buffers to a base decoder; and passing the one or more secure buffer to the secure execution space.

The method may further comprise the optional step of processing the video stream using an enhancement decoder based on identifying that playback of the video stream will not be problematic.

In certain examples, the step of identifying that playback of the video stream will be problematic may comprise: retrieving details of the device performing the method, comparing the details of the device to a predetermined list of details of problematic devices; identifying that playback of the video stream will be problematic if the retrieved details of the device correspond to details of a problematic device in the list; and identifying that playback of the video stream will not be problematic if the retrieved details of the device do not correspond to details of a problematic device in the list.

In some implementations, the base video signal may be an encrypted base video signal. That is, the video stream may be encrypted or the base video signal itself may be encrypted.

In further examples, identifying if playback of the video stream will be problematic comprises: identifying if certain EGL extensions are present and/or supported, and if certain GLES extensions are present and/or supported; if certain EGL extensions or GLES extensions are not present and/or supported, then the method further comprises identifying that playback of the video stream will be problematic; and if certain EGL extensions or GLES extensions are present and supported, then the method further comprises identifying that playback of the video stream will not be problematic. For completeness, EGL extensions are embedded system graphics library extensions which enable the creation of protected GL contexts and surfaces, which can both operate on protected content. GLES extensions are Open Graphics Library for Embedded Systems extensions, which enable textures to be tagged as protected so they can be used as framebuffer texture attachments. In some specific examples, the certain EGL extensions comprise EGL_protected_content_ext and the certain GLES extensions comprise GL_texture_protected_ext.

Additionally, the step of identifying problematic playback may comprise: identifying if a trusted execution environment, TEE, is present on a device performing the method.

In some advantageous examples, the step of identifying if playback of the video stream will be problematic comprises: identifying if a hardware cryptographic engine is present on a device performing the method; if a hardware cryptographic engine is present, then the method further comprises identifying that playback of the video stream will be problematic; and if a hardware cryptographic engine is not present, then the method further comprises identifying that playback of the video stream will not be problematic.

In some alternatives, identifying if playback of the video stream will be problematic comprises: identifying a security level of a device performing the method according to Widevine DRM Security Level Definitions, wherein on a secure level 3 device, as defined by the Widevine DRM Security Level Definitions, the method further comprises processing the video stream using an enhancement decoder. In this way, the processing may be performed regardless of whether or not EGL extensions are present on the device.

It will be appreciated that references to Widevine discussed below could be replaced with another DRM security vendor. For example, references to the Widevine DRM security level definitions could be replaced by security levels defined by another DRM vendor.

In certain advantageous implementations, the step of identifying if playback of the video stream will be problematic comprises: retrieving details of the device performing the method, comparing the details of the device to a predetermined list of details of problematic devices and identifying that playback of the video stream will be problematic if the retrieved details of the device correspond to details in the list; and if the retrieved details of the device do not correspond to details of a problematic device in the list, identifying if a trusted execution environment, TEE, is present on a device performing the method; if a TEE is not present, processing the video stream using an enhancement decoder, else if a TEE is present: identifying if certain EGL extensions and certain GLES extensions are present and supported; if the certain EGL extensions and certain GLES extensions are present and supported, then the method further comprises identifying that playback of the video stream will not be problematic; and if the certain EGL extensions or GLES extensions are not present and/or supported, then the method further comprises identifying that playback of the video stream will be problematic.

In some examples, the certain EGL extensions comprise EGL_protected_content_ext and the certain GLES extensions comprise GL_texture_protected_ext.

According to an aspect of the invention there is provided a mobile phone comprising the described computing system. According to an aspect of the invention there is provided a personal computer comprising the described computing system.

According to an aspect of the invention there is provided a video playback device comprising the described computing system. In particular, according to an aspect of the invention there is provided a set-top box comprising the described computing system.

There is further provided a TV decoder comprising the described computing system.

According to further aspects there may be provided a decoding architecture as described in any one of the examples described herein. There may also be provided a method, computer device, video decoder, mobile terminal or any other video decoding system, method, process and architecture described herein.

BRIEF DESCRIPTION OF THE DRAWINGS

Examples of systems and methods in accordance with the invention will now be described with reference to the accompanying drawings, in which.

DETAILED DESCRIPTION

This disclosure describes an implementation for integration of a hybrid backward-compatible coding technology with existing decoders, optionally via a software update. In a non-limiting example, the disclosure relates to an implementation and integration of MPEG-5 Part 2 Low Complexity Enhancement Video Coding (LCEVC). LCEVC is a hybrid backward-compatible coding technology which is a flexible, adaptable, highly efficient and computationally inexpensive coding format combining a different video coding format, a base codec (i.e. an encoder-decoder pair such as AVC/H.264, HEVC/H.265, or any other present or future codec, as well as non-standard algorithms such as VP9, AV1 and others) with one or more enhancement levels of coded data.

Further details regarding LCEVC technology may be found in PCT/GB2021/051940, GB2115342.4, GB2200285.1, GB2107036.2, WO2017/141038, all of which are incorporated by reference herein in their entirety.

Example hybrid backward-compatible coding technologies use a down-sampled source signal encoded using a base codec to form a base stream. An enhancement stream is formed using an encoded set of residuals which correct or enhance the base stream for example by increasing resolution or by increasing frame rate. There may be multiple levels of enhancement data in a hierarchical structure. In certain arrangements, the base stream may be decoded by a hardware decoder while the enhancement stream may be suitable for being processed using a software implementation. Thus, streams are considered to be a base stream and one or more enhancement streams, where there are typically two enhancement streams possible but often one enhancement stream used. It is worth noting that typically the base stream may be decodable by a hardware decoder while the enhancement stream(s) may be suitable for software processing implementation with suitable power consumption.

The video frame is encoded hierarchically as opposed to using block-based approaches as done in the MPEG family of algorithms. Hierarchically encoding a frame includes generating residuals for the full frame, and then a reduced or decimated frame and so on. In the examples described herein, residuals may be considered to be errors or differences at a particular level of quality or resolution.

Figure 1:
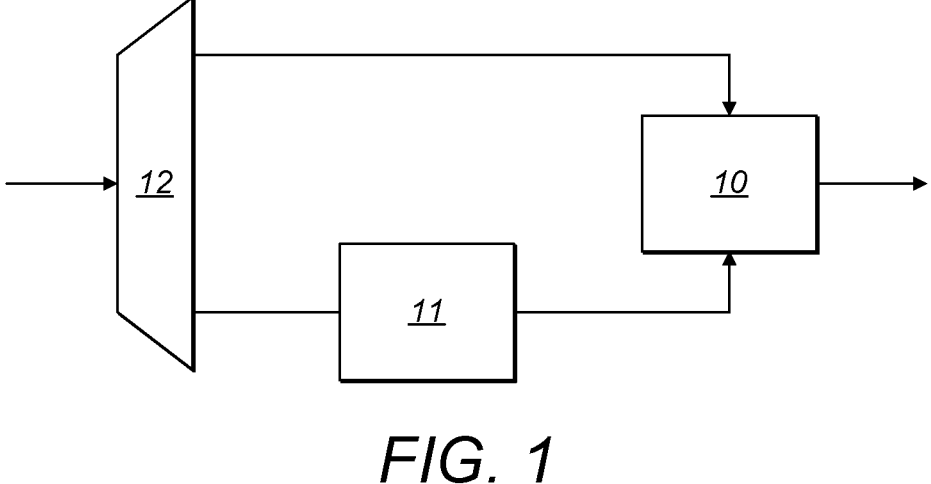
FIG. 1 shows a known, high-level schematic of an LCEVC decoding process.

For context purposes only, as the detailed structure of LCEVC is known and set out in the approved draft standards specification, FIG. 1 illustrates, in a logical flow, how LCEVC operates on the decoding side assuming H.264 as the base codec. Those skilled in the art will understand how the examples described herein are also applicable to other multi-layer coding schemes (e.g., those that use a base layer and an enhancement layer) based on the general description of LCEVC that is presented with reference to FIG. 1. Turning to FIG. 1, the LCEVC decoder 10 works at individual video frame level. It takes as an input a decoded low-resolution picture from a base (H.264 or other) video decoder 11 and the LCEVC enhancement data to produce a decoded full-resolution picture ready for rendering on the display view. The LCEVC enhancement data is typically received either in Supplemental Enhancement Information (SEI) of the H.264 Network Abstraction Layer (NAL), or in an additional track or data Packet Identifier (PID) and is separated from the base encoded video by a demultiplexer 12. Hence, the base video decoder 11 receives a demultiplexed encoded base stream and the LCEVC decoder 10 receives a demultiplexed encoded enhancement stream, which is decoded by the LCEVC decoder 10 to generate a set of residuals for combination with the decoded low-resolution picture from the base video decoder 11.

By additional PID we mean additional track or PID. By this we mean not only Transport Stream (PID) but also ISO Base Media File Format and WebM as container types.

Throughout the present description, the invention may be described in the context of NAL units. However, it should be understood that the NAL units in this context may refer equally and more generally to elementary stream input buffers, or equivalent. That is, LCEVC is equally capable of supporting non-MPEG base codecs, i.e. VP8/VP9 and AV1, that typically do not use NAL encapsulation. So where a term NAL unit is used, the term may be read to mean an elementary stream input buffer, depending on the base codec utilised.

LCEVC can be rapidly implemented in existing decoders with a software update and is inherently backwards-compatible since devices that have not yet been updated to decode LCEVC are able to play the video using the underlying base codec, which further simplifies deployment.

In this context, there is proposed herein a decoder implementation to integrate decoding and rendering with existing systems and devices that perform base decoding. The integration is easy to deploy. It also enables the support of a broad range of encoding and player vendors and can be updated easily to support future systems.

The proposed decoder implementation may be provided through an optimised software library for decoding MPEG-5 LCEVC enhanced streams, providing a simple yet powerful control interface or API. This allows developers flexibility and the ability to deploy LCEVC at any level of a software stack, e.g. from low-level command-line tools to integrations with commonly used open-source encoders and players.

The terms LCEVC and enhancement may be used herein interchangeably, for example, the enhancement layer may comprise one or more enhancement streams, that is, the residual data of the LCEVC enhancement data.

Figure 2A:
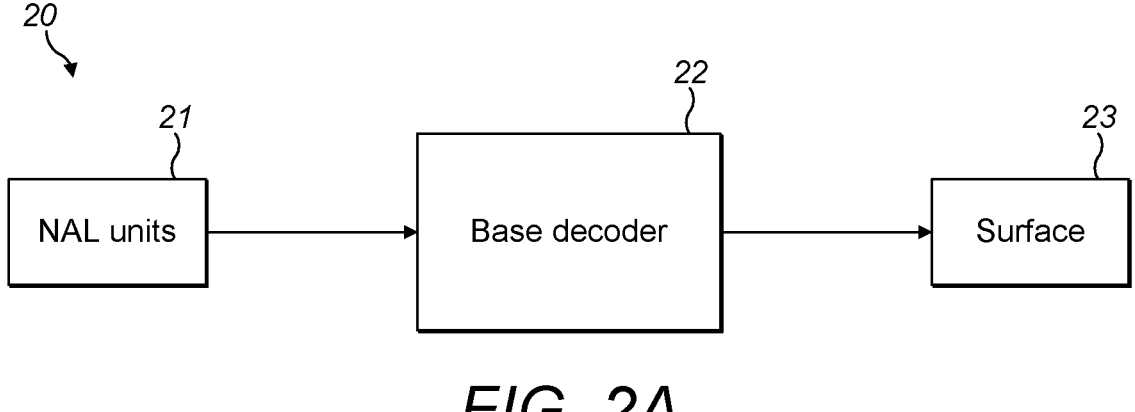
FIGS. 2a and 2b respectively show a schematic of a comparative base decoder and a schematic of a decoder integration layer in a video pipeline according to examples of the present disclosure.

FIG. 2a illustrates an unmodified video pipeline 20. In this conceptual pipeline, obtained or received Network Abstraction Layer (NAL) units are input to a base decoder 22. The base decoder 22 may, for example, be a low-level media codec accessed using a mechanism such as MediaCodec (e.g. as found in the Android® operating system), VTDecompression Session (e.g. as found in the iOS® operating system) or Media Foundation Transforms (MFT—e.g. as found in the Windows® family of operating systems), depending on the operating system. The output of the pipeline is a surface 23 representing the decoded original video signal, for example a frame of such a video signal, where sequential display of success frames renders the video.

Figure 2B:
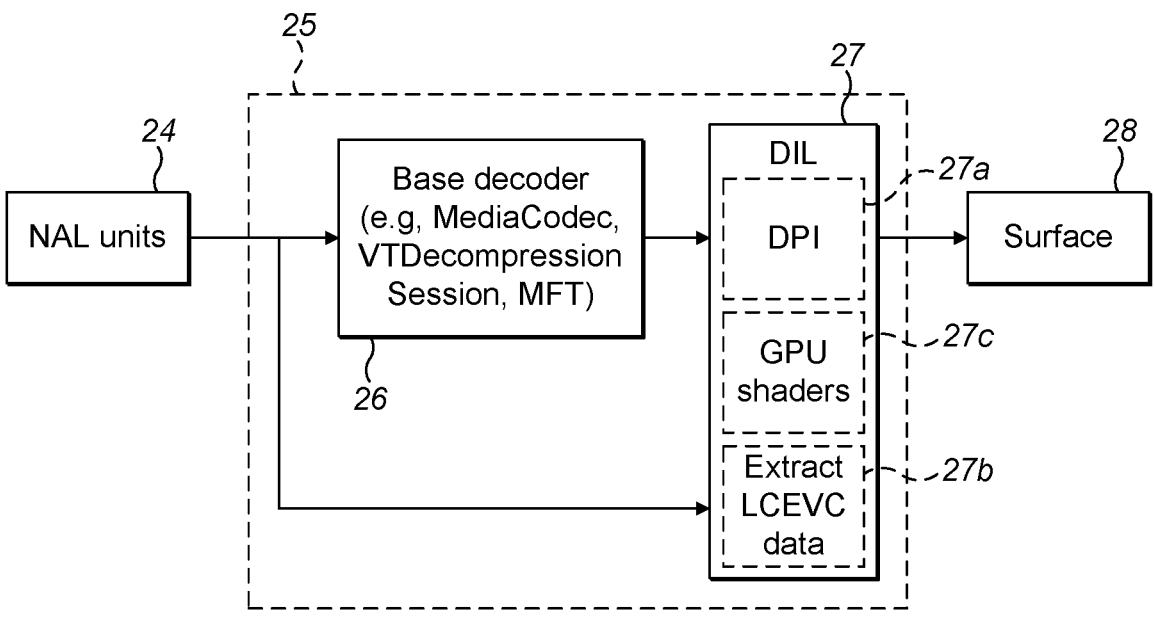

FIG. 2b illustrates a proposed video pipeline using an LCEVC decoder integration layer, conceptually. Like the comparative video decoder pipeline of FIG. 2a, NAL units 24 are obtained or received and are processed by an LCEVC decoder 25 to provide a surface 28 of reconstructed video data. Via the use of the LCEVC decoder 25, the surface 28 may be higher quality than the comparative surface 23 in FIG. 2a or the surface 28 may be at the same quality as the comparative surface 23 but require fewer processing and/or network resources.

As noted above, when we refer to NAL units here, we refer to elementary stream input buffers, or equivalent, depending on the base codec used.

In FIG. 2b, the LCEVC decoder 25 is implemented in conjunction with a base decoder 26. The base decoder 26 may be provided by a variety of mechanisms, including by an operating system function as discussed above (e.g. may use a MediaCodec, VTDecompression Session or MFT interface or command). The base decoder 26 may be hardware accelerated, e.g. using dedicated processing chips to implement operations for a particular codec. The base decoder 26 may be the same base decoder that is shown as 22 in FIG. 2a and that is used for other non-LCEVC video decoding, and for example may comprise a pre-existing base decoder.

In FIG. 2b, the LCEVC decoder 25 is implemented using a decoder integration layer (DIL) 27. The decoder integration layer 27 acts to provide a control interface for the LCEVC decoder 25, such that a client application may use the LCEVC decoder 25 in a similar manner to the base decoder 22 shown in FIG. 2a, e.g. as a complete solution from buffer to output. The decoder integration layer 27 functions to control operation of a decoder plug-in (DPI) 27a and an enhancement decoder 27b to generate a decoded reconstruction of an original input video signal. In certain variations, as shown in FIG. 2b, the decoder integration layer may also control GPU functions 27c such as GPU shaders to reconstruct the original input video signal from the decoded base stream and the decoded enhancement stream.

Network Abstraction Layer (NAL) units 24 comprising the encoded video signal together with associated enhancement data may be provided in one or more input buffers. The input buffers may be fed by a similar non-MPEG elementary stream input buffer, such as used for example in VP8/VP9 or AV1. The input buffers may be fed, or made available to the base decoder 26 and to the decoder integration layer 27, in particular the enhancement decoder that is controlled by the decoder integration layer 27. In certain examples, the encoded video signal may comprise an encoded base stream and be received separately from an encoded enhancement stream comprising the enhancement data; in other preferred examples, the encoded video signal comprising the encoded base stream may be received together with the encoded enhancement stream, e.g. as a single multiplexed encoded video stream. In the latter case, the same buffers may be fed, or made available to both the base decoder 26 and to the decoder integration layer 27. In this case, the base decoder 26 may retrieve the encoded video signal comprising the encoded base stream and ignore any enhancement data in the NAL units. For example, the enhancement data may be carried in SEI messages for a base stream of video data, which may be ignored by the base decoder 26 if it is not adapted to process custom SEI message data. In this case, the base decoder 26 may operate as per the base decoder 22 in FIG. 2a, although in certain cases, the base video stream may be at a lower resolution than comparative cases.

On receipt of the encoded video signal comprising the encoded base stream, the base decoder 26 is configured to decode and output the encoded video signal as one or more base decoded frames. This output may then be received or accessed by the decoder integration layer 27 for enhancement. In one set of examples, the base decoded frames are passed as inputs to the decoder integration layer 27 in presentation order.

The decoder integration layer 27 extracts the LCEVC enhancement data from the input buffers and decodes the enhancement data. Decoding of the enhancement data is performed by the enhancement decoder 27b, which receives the enhancement data from the input buffers as an encoded enhancement signal and extracts residual data by applying an enhancement decoding pipeline to one or more streams of encoded residual data. For example, the enhancement decoder 27b may implement an LCEVC standard decoder as set out in the LCEVC specification.

A decoder plug-in is provided at the decoder integration layer to control the functions of the base decoder. In certain cases, the decoder plug-in 27a may handle receipt and/or access of the base decoded video frames and apply the LCEVC enhancement to these frames, preferably during playback. In other cases, the decoder plug-in may arrange for the output of the base decoder 26 to be accessible to the decoder integration layer 27, which is then arranged to control addition of a residual output from the enhancement decoder to generate the output surface 28. Once integrated in a decoding device, the LCEVC decoder 25 enables decoding and playback of video encoded with LCEVC enhancement. Rendering of a decoded, reconstructed video signal may be supported by one or more GPU functions 27c such as GPU shaders that are controlled by the decoder integration layer 27.

In general, the decoder integration layer 27 controls operation of the one or more decoder plug-ins and the enhancement decoder to generate a decoded reconstruction of the original input video signal 28 using a decoded video signal from the base encoding layer (i.e. as implemented by the base decoder 26) and the one or more layers of residual data from the enhancement encoding layer (i.e. as implemented by the enhancement decoder). The decoder integration layer 27 provides a control interface, e.g. to applications within a client device, for the video decoder 25.

Depending on configuration, the decoder integration layer may output the surface 28 of decoded data in different ways. For example, as a buffer, as an off-screen texture or as an on-screen surface. Which output format to use may be set in configuration settings that are provided upon creation of an instance of the decoding integration layer 27, as further explained below.

In certain implementations, where no enhancement data is found in the input buffers, e.g. where the NAL units 24 do not contain enhancement data, the decoder integration layer 27 may fall back to passing through the video signal at the lower resolution to the output, that is, the output of the base decoding layer as implemented by the base decoder 26. In this case, the LCEVC decoder 25 may operate as per the video decoder pipeline 20 in FIG. 2a.

The decoder integration layer 27 can be used for both application integration and operating system integration, e.g. for use by both client applications and operating systems. The decoder integration layer 27 may be used to control operating system functions, such as function calls to hardware accelerated base codecs, without the need for a client application to have knowledge of these functions. In certain cases, a plurality of decoder plug-ins may be provided, where each decoder plug-in provides a wrapper for a different base codec. It is also possible for a common base codec to have multiple decoder plug-ins. This may be the case where there are different implementations of a base codec, such as a GPU accelerated version, a native hardware accelerated version and an open-source software version.

When viewing the schematic diagram of FIG. 2b, the decoder plug-ins may be considered integrated with the base decoder 26 or alternatively a wrapper around that base decoder 26. Effectively FIG. 2b can be thought of as a stacked visualisation. The decoder integration layer 27 in FIG. 2b, conceptually includes functionality to extract the enhancement data from the NAL units 27b, functionality 27a to communicate with the decoder plug-ins and apply enhancement decoded data to base decoded data and one or more GPU functions 27c.

The set of decoder plug-ins are configured to present a common interface (i.e. a common set of commands) to the decoder integration layer 27, such that the decoder integration layer 27 may operate without knowledge of the specific commands or functionality of each base decoder. The plug-ins thus allow for base codec specific commands, such as MediaCodec, VTDecompression Session or MFT, to be mapped to a set of plug-in commands that are accessible by the decoder integration layer 27 (e.g. multiple different decoding function calls may be mapped to a single common plug-in "Decode ( . . . )" function).

Since the decoder integration layer 27 effectively comprises a 'residuals engine', i.e. a library that from the LCEVC encoded NAL units produces a set of correction planes at different levels of quality, the layer can behave as a complete decoder (i.e. the same as decoder 22) through control of the base decoder.

For simplicity, we will refer to the instructing entity here as the client but it will be understood that the client may be considered to be any application layer or functional layer and that the decoder integration layer 27 may be integrated simply and easily into a software solution. The terms client, application layer and user may be used herein interchangeably.

In an application integration, the decoder integration layer 27 may be configured to render directly to an on-screen surface, provided by a client, of arbitrary size (generally different from the content resolution). For example, even though a base decoded video may be Standard Definition (SD), the decoder integration layer 27, using the enhancement data, may render surfaces at High Definition (HD), Ultra High Definition (UHD) or a custom resolution. Further details of out-of-standard methods of upscaling and post-processing that may be applied to a LCEVC decoded video stream are found in PCT/GB2020/052420, the contents of which are incorporated herein by reference. Example application integrations include, for example, use of the LCEVC decoder 25 by ExoPlayer, an application level media player for Android, or VLCKit, an objective C wrapper for the libVLC media framework. In these cases, VLCKit and/or ExoPlayer may be configured to decode LCEVC video streams by using the LCEVC decoder 25 "under the hood", where computer program code for VLCKit and/or Exo-Player functions is configured to use and call commands provided by the decoder integration layer 27, i.e. the control interface of the LCEVC decoder 25. A VLCKit integration may be used to provide LCEVC rendering on iOS devices and an ExoPlayer integration may be used to provide LCEVC rendering on Android devices.

In an operating system integration, the decoder integration layer 27 may be configured to decode to a buffer or draw on an off-screen texture of the same size of the content final resolution. In this case, the decoder integration layer 27 may be configured such that it does not handle the final render to a display, such as a display device. In these cases, the final rendering may be handled by the operating system, and as such the operating system may use the control interface provided by the decoder integration layer 27 to provide LCEVC decoding as part of an operating system call. In these cases, the operating system may implement additional operations around the LCEVC decoding, such as YUV to RGB conversion, and/or resizing to the destination surface prior to the final rendering on a display device. Examples of operating system integration include integration with (or behind) MFT decoder for Microsoft Windows® operating systems or with (or behind) Open Media Acceleration (OpenMAX-OMX) decoder, OMX being a C-language based set of programming interfaces (e.g. at the kernel level) for low power and embedded systems, including smartphones, digital media players, games consoles and set-top boxes.

These modes of integration may be set by a client device or application and the mechanism for selection and configuration will be described in more detail below.

The configuration of FIG. 2b, and the use of a decoder integration layer, allows LCEVC decoding and rendering to be integrated with many different types of existing legacy (i.e. base) decoder implementations. For example, the configuration of FIG. 2b may be seen as a retrofit for the configuration of FIG. 2a as may be found on computing devices. Further examples of integrations include the LCEVC decoding libraries being made available within common video coding tools such as FFmpeg and FFplay. For example, FFmpeg is often used as an underlying video coding tool within client applications. By configuring the decoder integration layer as a plug-in or patch for FFmpeg, an LCEVC-enabled FFmpeg decoder may be provided, such that client applications may use the known functionalities of FFmpeg and FFplay to decode LCEVC (i.e. enhanced) video streams. For example an LCEVC-enabled FFmpeg decoder may provide video decoding operations, such as: playback, decoding to YUV and running metrics (e.g. peak signal-to-noise ratio-PSNR or Video Multimethod Assessment Fusion-VMAF-metrics) without having to first decode to YUV. This may be possible by the plug-in or patch computer program code for FFmpeg calling functions provided by the decoder integration layer.

In general, there are two common approaches to secure video delivery; Conditional Access (CA) and Digital Rights Management (DRM). Conditional Access, used in the more traditional broadcast world with a physical authentication system (typically a smartcard). For online content distribution operators generally use Digital Rights Management (DRM). The aim of both of these approaches is clear: to prevent consumers getting illegal access to the content and to then freely distribute that content to other people.

With regards to protection, there are generally three areas that need to be considered: the compressed video stream should be encrypted; the output of the then decrypted video stream to the display should be through a protected pipe, e.g. using High-bandwidth Digital Content Protection (HDCP); and it should not be possible for software to 'capture' the content from the decoded and decrypted video. The latter can be achieved by having a secure platform that doesn't allow the execution of unapproved software, or by utilising a secure memory controller that prevents general access to the 'secure' memory.

A common teaching of the prior art is that secure video delivery can only be achieved with 'hardware' decoders, that way basically condemning primarily software-based approaches. In contrast, a more accurate and nuanced approach of that statement was considered when developing the described embodiments of the invention. This nuanced approach determined that a decoder could be configured to utilise hardware protection in the decoding system. In practice, a CPU typically can't read the video memory (i.e. a secure memory), but other hardware blocks can usually read the video memory (i.e. a secure memory), moreover, the GPU can usually read the video memory (i.e. a secure memory) in a protected mode.

The described embodiments are further based on a consideration that only a relatively small portion of the LCEVC (or other tier based encoding systems) implementation on the decoder side is actually critical in regard of content security, namely only the upscaling of the decoded base layer (and other operations using the upscaled decoded base layer).

As for the base layer, this is processed by the existing base decoder that is typically implemented in hardware, meeting Encoded Content Protection (ECP) requirements. Furthermore, this part of the LCEVC (or other tier based codec) stream is—by design—downscaled typically to a quarter of the original resolution i.e., in case of a 2160p transmission the base layer will be encoded in HD resolution.

Figure 4:
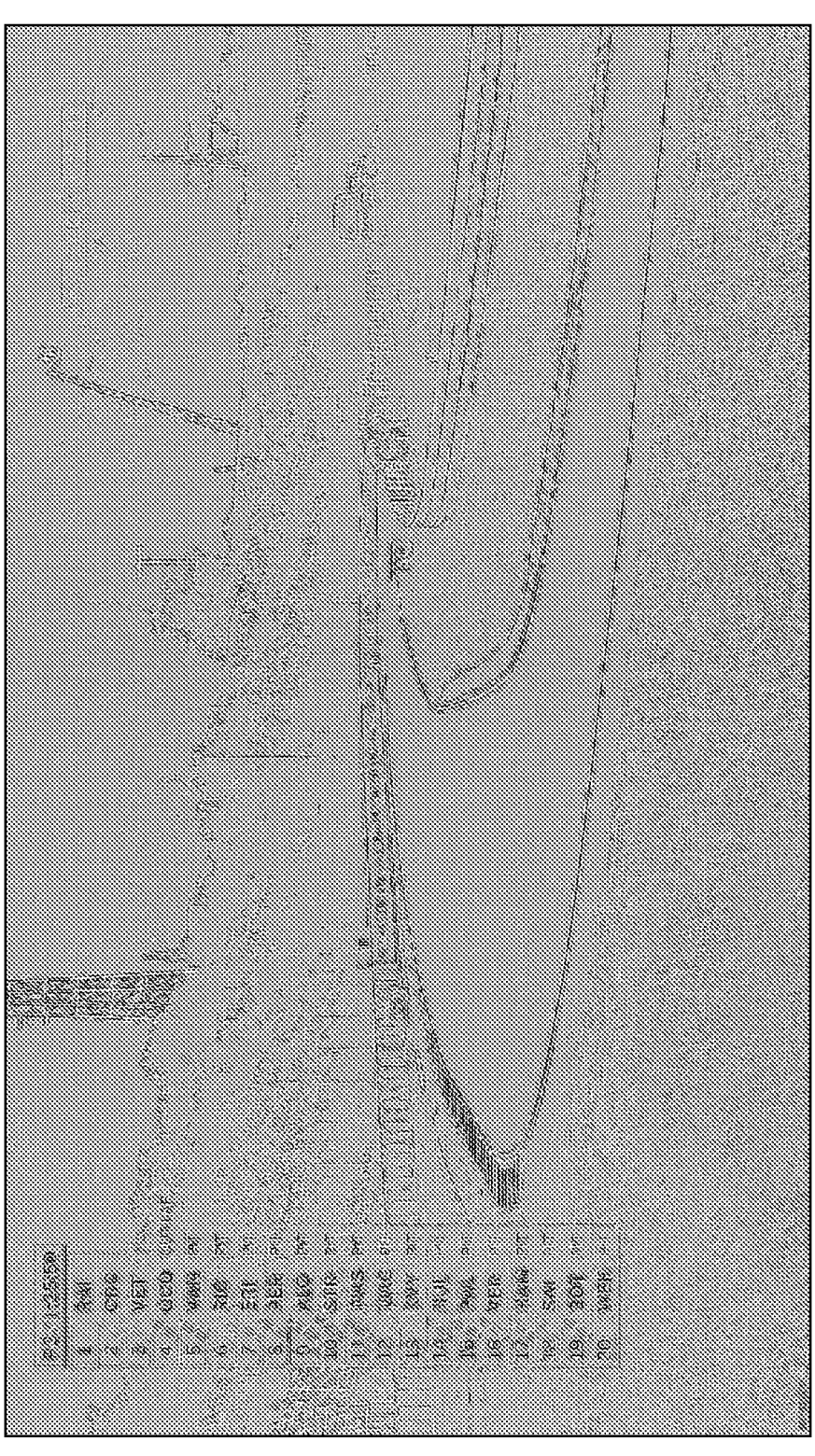
FIG. 4 illustrates an enhancement layer.

Regarding the (e.g. LCEVC) enhancement layer, this only contains residual information and is of no particular value (with regards to security) before it has been combined with the upscaled decoded base layer. Implementing the enhancement decoder in software therefore does not present any particular security risk. An example of a residual map can be seen in FIG. 4. As can be seen in FIG. 4, a potential consumer would get no real benefit from (and no motivation to) illegally copying and/or distributing the enhancement layer to other people.

The security relevant part of the tier based (e.g. LCEVC) decoder implementation lies in the processing steps where the decoded enhancement layer is combined with the decoded (and upscaled) base layer to create the final output sequence. Depending on what level of the stack the tier based (e.g. LCEVC) decoder is being implemented, different approaches exist to establish a secure and ECP compliant content workflow.

As explained above, handling the decoding of the LCEVC enhancement layer in the General Purpose Memory (i.e. unsecure memory) does not present a security risk due to the lack of value of the residual information that layer contains (illustrated in FIG. 4). With the base decoder utilising the Secure Memory, the challenge lies in how to combine the output from the base decoder in Secure Memory and the LCEVC decoder output in General Purpose Memory to assemble the enhanced output sequence. Embodiments of the present invention solve this problem via two similar approaches: a number of the embodiments of the present invention provide a secure decoder when LCEVC is implemented at a driver level implementation; whereas other embodiments of the present invention provide a secure decoder when LCEVC is implemented at a System on a Chip (SoC) level. Which approach of the two is utilised depends on the capabilities of the chipset used in the respective decoding device.

The embodiments of the present invention that implement LCEVC (or other tier based codecs) on a device driver level utilise hardware blocks or GPU. In general, once the base layer and the (e.g. LCEVC) enhancement layer have been separated, most of the decoding of the (e.g. LCEVC) enhancement layer takes place in the CPU and hence in General Purpose (unsecure) Memory. A module (e.g. a secure hardware block or GPU) is used to up-sample the output of the base encoder using Secure Memory, combines the upsampled output with predicted residuals and applies the decoded enhancement layer (e.g. LCEVC residual map) coming from General Purpose (unsecure) Memory. Afterwards, the output sequence (e.g. an output plane) is sent to a protected display via an output module (e.g. a Video Shifter), which is part of an output video path in the decoder (i.e. in the chipset).

Figure 3:
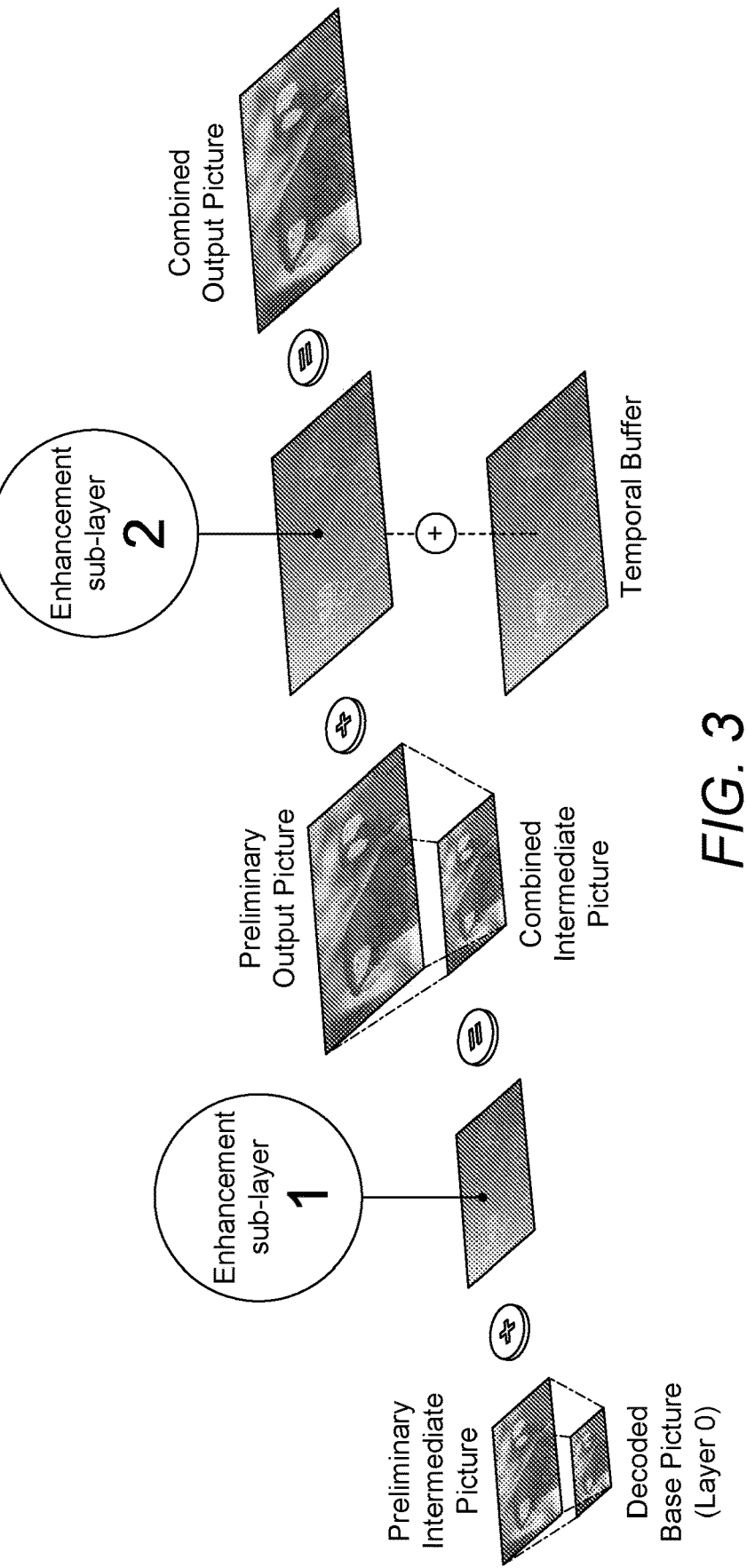
FIG. 3 illustrates a schematic of LCEVC.

FIG. 3 is a schematic diagram showing process flow of LCEVC. At a first step, a base decoder decodes a base layer to obtain low resolution frames (i.e. the base layer). As a next step, an initial enhancement (a sub layer of the enhancement layer) corrects artifacts in the base. As a further step, final frames (for output) are reconstructed at the target resolution by applying a further (e.g. further residual details) sub layer of the enhancement layer. This illustrates that by best exploiting the characteristics of existing codecs and the enhancement, LCEVC improves quality and reduces the overall computational requirements of encoding. Embodiments of the invention provide for this to be achieved in a secure manner (e.g. when handling protected content).

FIG. 4 illustrates an enhancement layer. As can be seen, the enhancement layer comprises sparse highly detailed information, which are not interesting (or valuable to a viewer) without the base video.

The Android OMX framework provides a range of codecs for the Android Stagefright media playback engine. An example of the present disclosure relates to a modification to OMX to integrate OMX into the LCEVC coding scheme. This ensures that protected content and resources (e.g. premium content) does not lose its protected status at any point during LCEVC processing. In other words, an example of the disclosure relates to an implementation of Android's OMX framework to enable LCEVC to work with protected content. Although the examples presented below relate to Android® and OMX, the concepts can be applied to other operating systems and corresponding secure operating spaces.

The following sets out an example of integration of an enhancement decoder into existing platforms. Doing so presents challenges, particularly to ensure that encrypted video and content remains secure.

Two exemplary approaches are proposed to integrate LCEVC into Android devices, both methods are applicable to the main device categories envisaged for video playback, namely TVs, set-top boxes (STBs) and mobile phones/tablets. A further contemplated approach takes LCEVC integration beneath the Android software stack directly into the Board Support Package domain.

Both of these approaches are built around a DIL (Decoder Integration Library), a multiplatform library that decodes LCEVC data and enhances the base video.

More detailed reference information about how LCEVC works may be found at LCEVC.org (accessed 12 Jan. 2022).

The DIL is a library used to integrate LCEVC decoding and rendering to an existing legacy decoder implementation. The DIL can be used in both an application-level implementation and an OS level implementation. In the application-level implementation the DIL renders directly onto an on-screen surface, provided by the client, of arbitrary size (generally different from the content resolution). An example of this is Android's® ExoPlayer.

In the OS level implementation, the DIL decodes onto a buffer or draws onto an off-screen texture of the same size of the content final resolution, but it does not handle the final render to display, including YUV to RGB conversion, and resizing to the destination surface. Examples of OS level implementation are MFT, which is used in Microsoft's® Windows operating systems, and OMX, used by Android®.

The first proposed approach is less complex and targets integration of LCEVC directly into ExoPlayer as an ExoPlayer Extension that incorporates the DIL to perform LCEVC decoding and enhancement of the base video frames. The below example describes an application level implementation and refers to Android's® ExoPlayer as an example to focus the discussion. It is to be understood that the concepts described below are equally applicable to media players for other operating systems, such as iOS®.

Android supports GPU post-processing of protected video content. This lets applications use the GPU for complex, nonlinear video effects, mapping protected video content onto textures for use in general graphics scenes, and virtual reality (VR).

Support is enabled using an EGL extension and a GLES extension. The EGL extension, sometimes expressed as "EGL_EXT_protected_content", enables the creation of protected GL contexts and surfaces, which can both operate on protected content.

The GLES extension, which is sometimes expressed as GL_EXT_protected_textures, enables tagging textures as protected so they can be used as framebuffer texture attachments.

As has been mentioned, integrating an enhancement decoder into existing platforms presents a particular challenge where premium content is concerned. For premium content, the extension EGL_EXT_protected_content is utilised. This extension introduces the concept of protected contexts and protected resources, specifically surfaces and EGLImages. Applications can choose at creation time whether a context, surface or EGLImage is protected or not. A protected context is required to allow the GPU to operate on protected resources, including protected surfaces and protected EGLImages.

EGL (Embedded-System Graphics Library) is an interface between Khronos rendering APIs (such as OpenGL, OpenGL ES or OpenVG) and the underlying native platform windowing system. EGL handles graphics context management, surface/buffer binding, rendering synchronization, and enables "high-performance, accelerated, mixed-mode 2D and 3D rendering using other Khronos APIs." EGL is managed by the non-profit technology consortium Khronos Group.

As for OpenGL ES (Open Graphics Library for Embedded Systems) the latest stable version is 3.2 released in August 2015, which can be found in most, if not all Android® devices brought to market in the past 2 to 3 years and many before this. Most of those devices also support the required extension EGL_EXT_protected_content. If not present, OpenGL ES 3.2 with the required extension can be installed on the device via OTA download.

By setting the protected context at the creation of the application the GPU is allowed to operate on protected resources, such as the memory where the decoded base layer video, which will be uploaded into the GPU, is stored. The necessary enhanced decoding steps added by LCEVC such as upscaling of the base layer video, filtering and adding the residual data from the enhancement layer will take place before the data is delivered to the secure surface set by the player to display the video, or to send it in a protected format, for example HDCP, to the HDMI interface.

When ExoPlayer, intended as the main player class, instantiates a renderer such as "extension-Icevc", it may pass a DrmSessionManager object that determines whether the playback is "secure" or not.

For the extension to operate in secure mode the following requirements may need to be met:

1. Secure mode is supported by using the RGB texture mode (which is the default mode for the extension-Icevc) as output of the MediaCodec base video decoder and input to the DIL. This is because in texture mode the LCEVC enhancement can be applied in GPU without any LCEVC implementation code having access to the raw pixel values anywhere from Media-Codec all the way to the display.

2. From Android API>=24, that is Android versions 7.0 and later, when the extension-Icevc is configured in "secure" mode the extension checks that the EGL extension EGL_EXT_protected_content is available, which means that the device supports keeping decrypted video in trusted memory.

3. In RGB texture mode, MediaCodec is configured to output decoded video onto an off-screen texture, backed by an EGL pixel buffer (pbuffer) surface. When in secure mode the EGL context and the pixel buffer surface are both created with the EGL_PROTECTED_CONTENT_EXT attribute set.

The decoded picture texture is then passed to the DIL, which again will have its EGL context and destination window configured with the same EGL_PROTECTED_CONTENT_EXT attribute and will use the GL_TEXTURE_PROTECTED_EXT parameter for the textures it uses internally in its LCEVC enhancement pipeline stages.

When the DIL is created in secure mode, it may trigger several changes:

1. The context is created using an EGL_PROTECTED_CONTENT_EXT attribute.

2. The EGL window is created using an EGL_PROTECTED_CONTENT_EXT flag, which will mean that it can only be read into other secure components.

All the GLES Texture objects used in the DIL pipeline are created using with GL_TEXTURE_PROTECTED_EXT parameter set, meaning that if they will only read correctly into other secure components.

The GLES pipeline consists of the following steps:

Ingest: The base format image is split into YUV components, each of which are separate textures. This can involve a colour conversion if the original image is in RGB format. After this stage the textures are packed with 4 pixels stored in a horizontal row in each texture element (texel). The texels are in RGBA format.

Apply Base Residual: This optional stage adds residuals components.

1. Upscale in X: Take the image and upscale it by a factor of 2 in the x-direction, i.e. the horizontal direction, by applying an upscaling filter. When in 1D mode, this also applies Predicted Average (PA) to correct errors during upscaling.

2. The next stage of the pipeline can be occur in two different ways, depending on whether the base format image is in 1D or 2D. These produce textures packed into a 2×2 square instead of a 4×1 row.

a. For a 1D base format image, apply high residual. A specific implementation of applying a high residual is frag_apply_perseus.glsl.

b. For a 2D base format image, upscale along the y-direction, i.e. the vertical direction, by a factor of 2 using the upscaling filter, then apply PA and apply the high residuals. A specific implementation of applying high residuals to a 2D base format image is frag_upscale_pa_apply_l2x2.glsl.

3. The final stage of the pipeline is to prepare the output and includes one of the following, depending on the base format image:

a. Merge YUV components back into a single RGB texture, this involves a colour conversion. A specific implementation of a color conversion is frag_merge_luma_chroma.glsl.

b. Unpack the textures into a 4×1 row.

As first introduced above, in addition to the application level implementation, the DIL can be used in an OS level implementation, also referred to as a platform approach. In the OS level implementation, two OMX components have been proposed for implementation with non-secure content: OMX.vnova.video.decoder.avc-Icevc and OMX.vnova.video.decoder.hevc-Icevc.

The extension OMX.google.android.index.enableAndroidNativeBuffers is used for the output port with the client allocating native_handle_t objects for the output buffers. The component wraps these native_handle_t objects in an AHardwareBuffer which the DIL (Decoder Integration Layer) decodes into.

The present disclosure provides an implementation of a DRM solution using OMX for Android® 7.0 onward.

In order to prepare the approach for handling secure content, two new components may need to be registered with Android® as having the "secure playback" feature. These are OMX.vnova.video.decoder.avc-Icevc.secure and OMX.vnova.video.decoder.hevc-Icevc.secure. These two components may require the base component to also be a component with the "secure playback" feature and to be operated with the OMX.google.android.index.allocateNativeHandle extension.

By implementing the OMX.google.android.index.allocateNativeHandle extension, in addition to the OMX.google.android.index.enableAndroidNativeBuffers extension, the component allocates secure native_handle_t objects that will contain the decrypted bitstream.

The LCEVC OMX Component uses the base OMX component to implement OMX.google.android.index.enableAndroidNativeBuffers. This will result in the input buffers being allocated in secure memory only readable by secure hardware. As such the data contained in these buffers will be inaccessible from within the LCEVC OMX Component.

A secure OMX component is proposed to fit into this framework that implements LCEVC integration using the security primitives provided by the Android system. The LCEVC integration may use the DIL encapsulated within the OMX component. Once the DIL receives video data securely, using Android® framework, it decodes and applies LCEVC to the base video securely, as described above, within the GPU.

The DIL may allocate AHardwareBuffers with the AHARDWAREBUFFER_USAGE_PROTECTED_CONTENT flag. Setting the flag will make sure the buffer is protected from direct CPU access or from being read by non-secure hardware, such as video encoders. This flag is incompatible with CPU read and write flags and is mainly used when handling DRM video. This also relates to the EGL extension EGL_EXT_protected_content and GL extension GL_EXT_protected_textures as introduced above.

Figure 5:
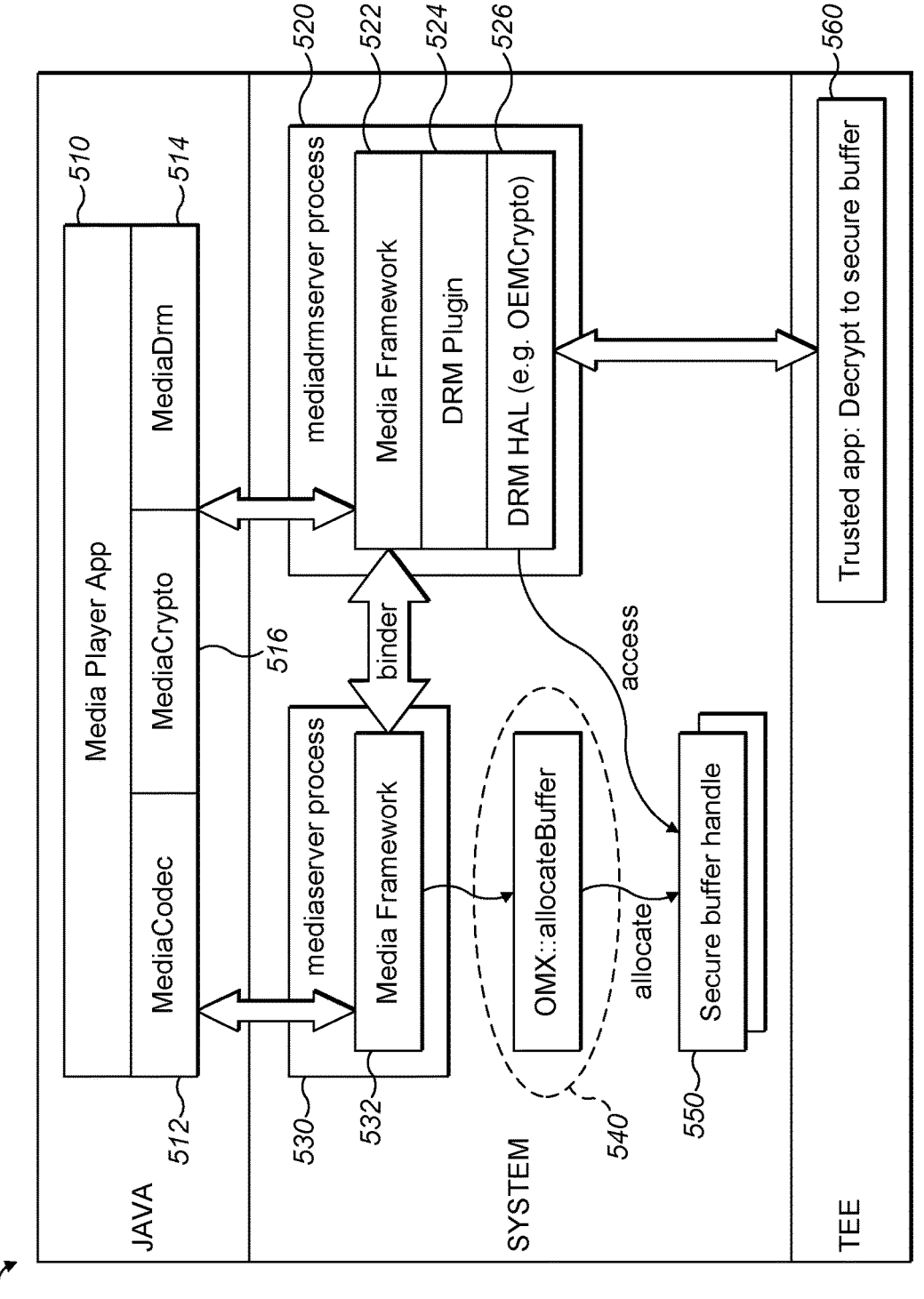
FIG. 5 shows the OMX component in the context of a DRM enabled media sub system.

FIG. 5 puts this into context. FIG. 5 is taken from Android documentation and shows the OMX component 540 (circled in a dashed line) in the context of a DRM enabled media sub system 500. It can be seen that the DRM enabled media sub system 500 comprises a JAVA layer, a SYSTEM layer and a trusted execution environment (TEE).

The JAVA layer comprises a Media Player App 510. The Media Player App 510 interfaces with a MediaCodec block 512, a MediaDrm block 514 and a MediaCrypto block 516.

The MediaCodec block 512 is communicatively coupled to a Media Framework 532 in a mediaserver process block 530 in the SYSTEM layer. The mediaserver process block 530 comprises the Media Framework 532. The MediaCrypto block 516 and the MediaDrm block 514 are communicatively coupled to Media Frameworks 522 in a mediadrm-server process block 520 in the SYSTEM layer. The mediadrmserver process block 520 further comprises a DRM Plugin block 524 and a DRM Hadware Abstraction Layer (HAL) block 526. An example of DRM HAL is OEM-Crypto. The Media Framework block 522 of the mediadrmserver process 520 is bound to the Media Framework block 532 of the mediaserver process block 530 by a binder.

The SYSTEM layer further comprises an OMX component 540, circled with a dashed line. The OMX component is configured to allocate one or more secure buffer handles 550 which may be accessed by the DRM HAL block 526.

The DRM HAL block 526 is additionally coupled to an application block 560 in the TEE. The trusted application block is configured to decrypt protected content to a secure buffer.

Figure 6:
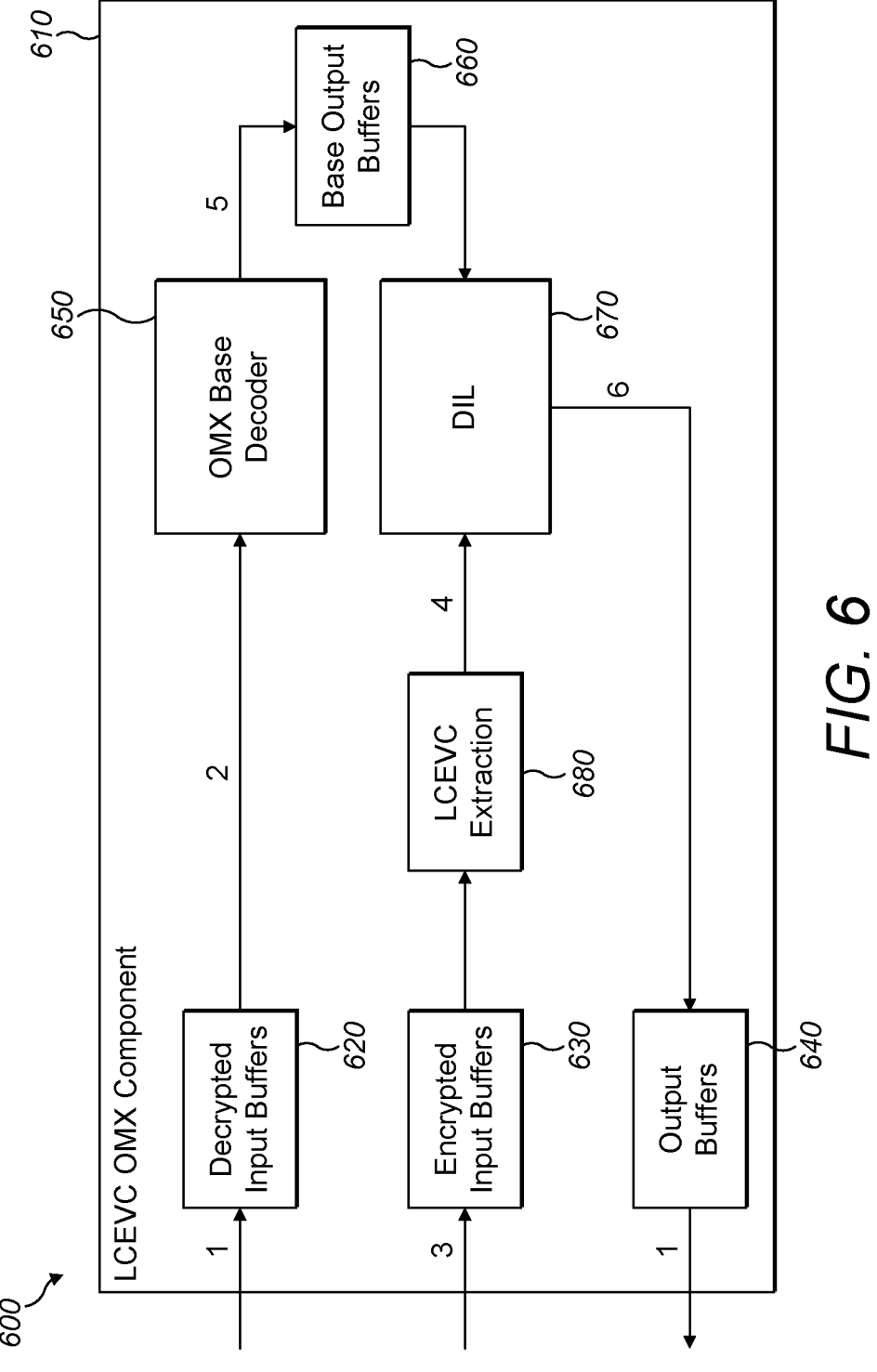
FIG. 6 illustrates the proposed Android OMX control flow.

FIG. 6 shows the internals of the LCEVC enabled OMX component 600 developed according to examples of the present disclosure. The LCEVC OMX component 600 may be referred to as a secure execution space. The LCEVC OMX component 600 is responsible for creating buffers it uses. These may be used to retrieve data from sources within the rest of the Android media subsystem.

The LCEVC OMX component 600 comprises one or more decrypted input buffers 620, one or more encrypted input buffers 630, and one or more output buffers 640. The LCEVC OMX component 600 further comprises an OMX Base Decoder 650, one or more Base Output Buffers 660 a DIL 670 and a LCEVC extraction block 680.

The numbers of the below list describe the key data types and movement for the corresponding arrow shown in FIG. 6.

1. Decrypted video stream (DRM protected stream decrypted by Android) passed to the secure LCEVC OMX component using decrypted input buffers 620 which have been allocated by the base decoder 650 and are only accessible by the base component's secure hardware.
2. Full decrypted video stream sent directly to the OMX base decoder 650 for the relevant base video codec type. Additionally, LCEVC data, usually in the clear, is then passed to the DIL via the LCEVC extraction block 680. In this context, clear data refers to unencrypted data.

3. Encrypted video stream is passed to secure LCEVC OMX component 600 using encrypted input buffers 630 that are CPU accessible.
4. Unencrypted LCEVC data is extracted from the encrypted video stream by LCEVC extraction block 680 and passed to the DIL 670.
5. Decoded base video data is output from the OMX base decoder 650 and passed to the DIL 670 via base output buffers 660, using an AHardwareBuffer with the protected content flag set. Within the DIL 670 the decoding process is as described above within the GPU.
6. Output from the DIL 670 can be directly rendered to an output buffer 640, such as a screen, by the DIL 670 or returned to the Android system as an AHardwareBuffer with the protected content flag set.

The following sets out an example of decoder integration as proposed herein on the Android platform, using a modified OMX framework as an example of a modified secure execution or secure operation space as proposed herein.

An LCEVC solution has been developed for STBs running Android Open-Source Project (AOSP). The development is targeted at those building their own STBs, for example STB vendors and broadcasters.

This development integrates LCEVC into the heart of the Android OMX framework as a plugin. The OMX framework provides a range of codecs for the Android Stagefright media playback engine. This is accessible from applications using MediaCodec capability. This Android-level integration means that the LCEVC codec becomes available to all applications on the device without the need for application-level changes. This is very useful if the device has multiple applications requiring LCEVC support.

The main components of the solution are OMX source modifications, a decoder plugin and an encoder plugin. The decoder and encoder plugins respectively include the DIL and an Encoder Integration Library (EIL). The EIL can be thought of as a base encoder's counterpart to the DIL. That is, an EIL allows enhancement coding to be performed with a base encoder. The encoder plugin is unlikely to be integrated into video specific Customer Premises Equipments (CPEs), such as TVs, STBs and streamers.

The OMX source modifications are modifications to the existing Android OMX source files. These are likely to be distributed as AOSP version-specific source code patches that integrators will have to incorporate.

There may be provided a range of OMX decoder and encoder plugins as shown in the table below. An implementation may integrate most (or all) of these plugins.

| Component | Function | Codec | Security Level |
|---|---|---|---|
| OMX . . . video.decoder.avc-lcevc | Decoder | AVC base + LCEVC enhancement | Non-secure |
| OMX . . . video.decoder.hevc-lcevc | Decoder | HEVC base + LCEVC enhancement | Non-secure |
| OMX . . . video.encoder.avc-lcevc | Encoder | AVC base + LCEVC enhancement | Non-secure |
| OMX . . . video.encoder.hevc-lcevc | Encoder | HEVC base + LCEVC enhancement | Non-secure |
| OMX . . . video.decoder.avc-lcevc.secure | Decoder | AVC base + LCEVC enhancement | Secure |
| OMX . . . video.decoder.hevc-lcevc.secure | Decoder | HEVC base + LCEVC enhancement | Secure |

Several AVC/HEVC plugin variants may exist as each plugin creates an instance of the native base codec inside of itself to do the base layer processing. Non-secure and secure variants also exist for handling clear and DRM protected content. These variants must allocate CPU buffers or GPU textures appropriate to the required protection level.

Figure 7:
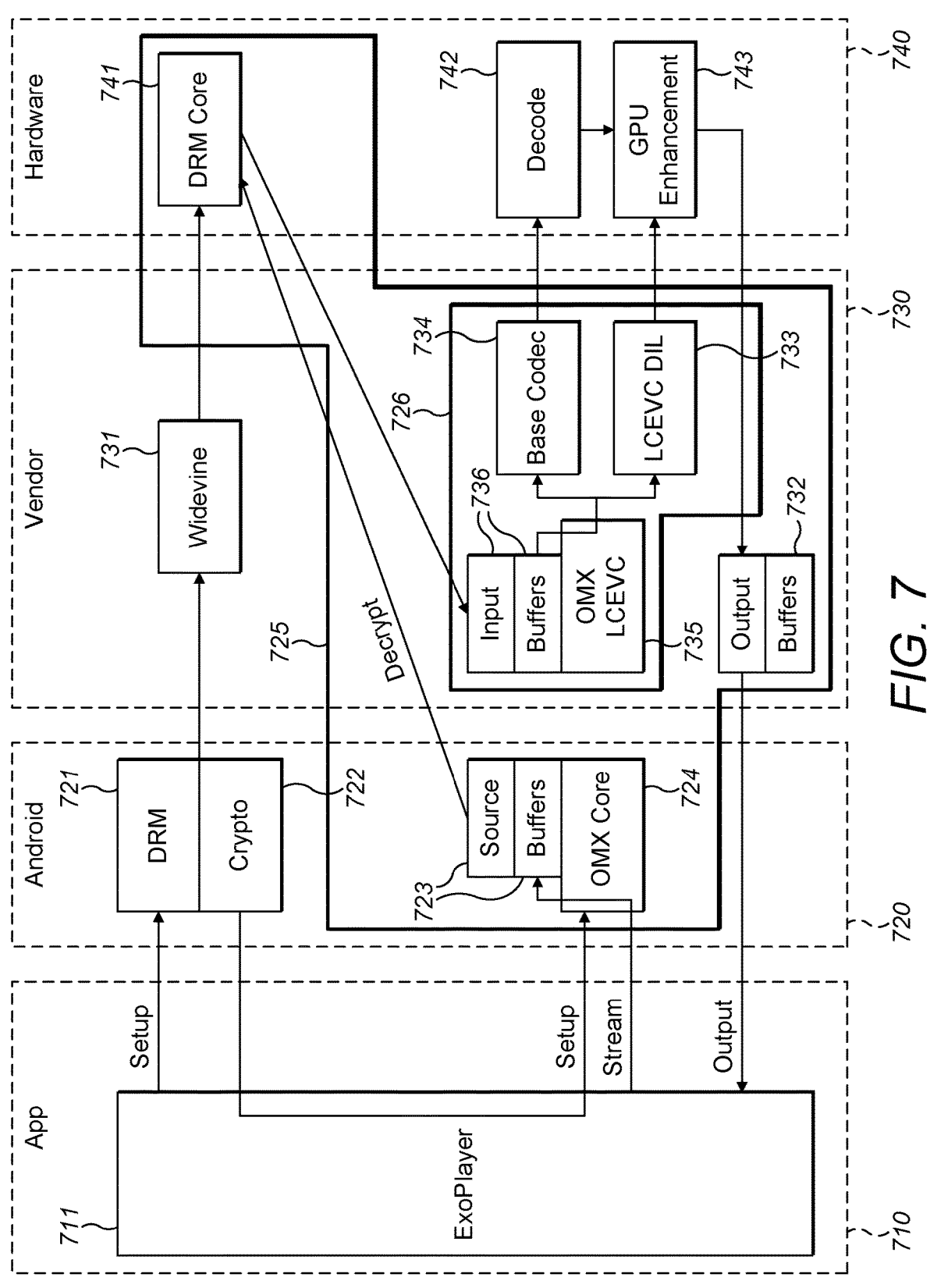
FIG. 7 illustrates an overview of the OMX components.

FIG. 7 illustrates a high-level proposed architecture. The box 725 gives an exemplary overview of how the data flow differs from a non-LCEVC decoder.

The architecture comprises an application layer 710, an operating system layer, 720 (which in this case is an Android layer), a vendor layer 730 as well as a hardware layer 740.

The application layer 710 comprises ExoPlayer 711. The Android layer comprises a DRM block 721, a Crypto block 722 as well as an OMX core 724. The Android layer also comprises one or more source buffers 723. These will be discussed below.

The vendor layer 730 comprises a Widevine block 731, i.e. a DRM block, a LCEVC OMX component 735, a base codec interface 734, a DIL 733 and output buffers 732. The LCEVC OMX component 735, base codec interface 734 and DIL 733 respectively correspond to the LCEVC extraction block 680, OMX base decoder 650 and DIL 670 shown in FIG. 6. The box 726 can therefore be considered to represent the LCEVC OMX component 600.

The hardware layer 740 comprises a decryption module 741, labelled as a DRM Core, a decoding block 742 and a GPU enhancement block 743.

ExoPlayer 711 is an application-level media player for Android maintained by Google under Apache License 2.0, with support of HLS, DASH and SmoothStreaming adaptive playbacks. ExoPlayer 711 is easy to customize and extend. ExoPlayer 711 also supports features not currently provided by the standard Android MediaPlayer, including Dynamic Adaptive Streaming over HTTP (DASH), SmoothStreaming and Common Encryption.

The arrows shown in FIG. 7 indicate a connection between blocks in the architecture. For example, the arrows may indicate information being passed between components in the architecture. It can be seen that ExoPlayer 711 sets up the DRM block 721, and is communicatively coupled to the DRM block 721. The DRM block 721 is in turn communicatively connected to the Widevine block 731. The Widevine block 731 is communicatively coupled to the DRM core 741. Although a Widevine block is used in this example, it is to be understood that another DRM technology could be used in place of the Widevine block. That is, the Widevine block 731 is interchangeable or replaceable with a DRM technology component provided by another DRM vendor.

The Crypto block 722 sets up the OMX Core 724, and the one or more source buffers 723 receive a stream, for example a video stream, from the ExoPlayer 711. The one or more source buffers 723 and one or more input buffers 736 are passed to the DRM core 741. The contents of the one or more source buffers 723 are decrypted and stored in the in the one or more input buffers 736. The one or more input buffers are then passed to the OMX LCEVC block 735. The one or more input buffers 736 are subsequently passed to the base codec 734 and the DIL 733. The base codec 734 in the vendor layer 730 works together with the decoding block 742 in the hardware layer 740 to decode the stream. In this example, the Base Codec 734 in the vendor layer represents the OMX interface over the chip, or rather, the OMX interface over the drivers, which control the chip. That is, the Base Codec 734 interfaces with the hardware decoder 742. The GPU enhancement block 743 receives the output of the decoding block 742 and the output of the DIL 733. The output of the GPU enhancement block 743 is a decrypted, decoded and enhanced video signal, for example a frame of the video signal, and is provided to the one or more output buffers 732.

The encoded video stream typically comprises an encrypted video signal and an enhancement video signal. Optionally, the enhancement video signal may comprise one or more layers of residual data, being generated based on a comparison of data derived from a decoded video signal and data derived from an original input video signal. The one or more source buffers 723 are created for the purpose of receiving the video stream. The one or more input buffers 736 and one or more output buffers 732 are created in the secure execution space. The output buffers 732 are configured to receive decrypted data. The input buffers 736 may comprise decrypted input buffers or encrypted/protected input buffers.

The one or more source buffers 723 and protected input buffers 736 are passed to the decryption module 741. The encryption module 741 decrypts the encrypted base video signal and stores the decrypted base video signal in the one or more protected input buffers 736. The protected input buffers 736 are then passed to the base codec 734 to decode the decrypted video signal. The one or more source buffers 723 are also passed to the secure execution space so that the enhancement video signal can be decoded by the enhancement decoder.

Figure 8:
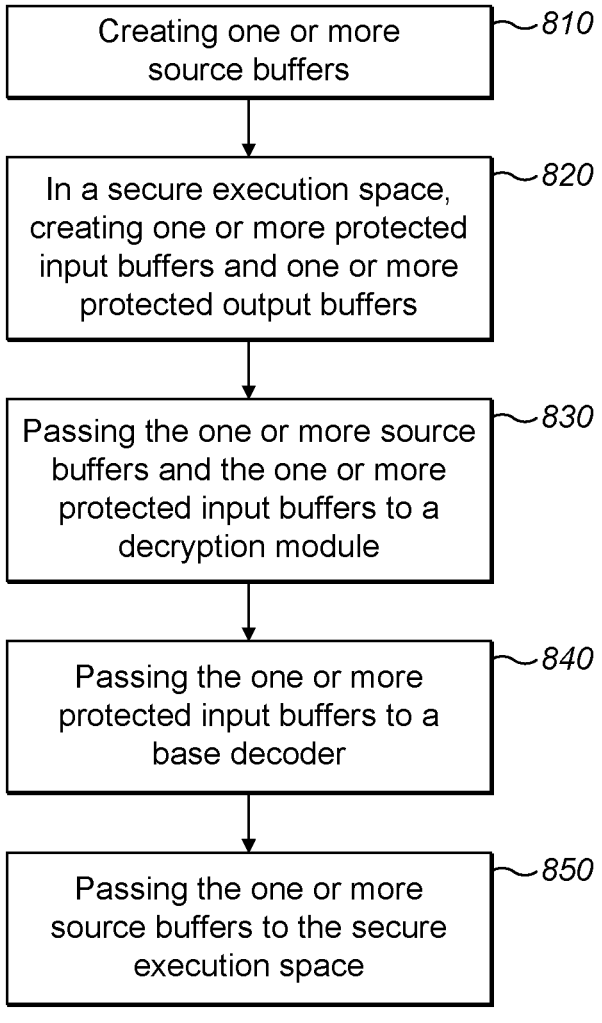
FIG. 8 illustrates a method of implementing an enhancement decoding.

FIG. 8 illustrates a method of performing an enhancement encoding in the architecture of FIG. 7 according to an example of the present disclosure. It will be appreciated that the method realises the advantages discussed above. That is, both encrypted and decrypted video signals may be passed to a secure execution space. In this way, protected content is not exposed to unprotected resources and may be securely processed. The secure execution space fits into existing frameworks implementing enhanced coding by using security primitives provided by the operating system. Further, the framework modifications needed to implement the secure execution space are minimal, which reduces maintenance costs over time In step 810, one or more source buffers, for example source buffers 723, are created to receive an encoded video stream, the encoded video stream comprising an encrypted base video signal and an enhancement video signal.

In a subsequent step 820, in a secure execution space, one or more protected input buffers and one or more protected output buffers are created to receive decrypted data.

In a further step 830, the one or more source buffers and the one or more protected input buffers are passed to a decryption module, such as DRM core 741, to decrypt the encrypted base video signal and store the decrypted base video signal in the one or more protected input buffers.

The method further comprises, at step 840, passing the one or more protected input buffers to a base decoder to implement a base decoding layer to decode the decrypted base video signal.

In step 850, the one or more source buffers are passed to the secure execution space for decoding the enhancement video signal using an enhancement decoder.

In some examples, the base decoder 734 decodes the decrypted base video signal into a protected base output buffer which may subsequently be passed to the DIL.

Both the decrypted base and LCEVC may be available to a common secure execution space—the OMX component.

In another example, the proposed framework starts a new DRM protected playout session as follows:

1. ExoPlayer 711 creates an instance of a DRM Core 741 on the hardware layer 741 block to handle DRM decryption.
2. ExoPlayer 711 creates a MediaCodec object, passing the Crypto block to it.
3. The MediaCodec component sets up an LCEVC OMX plugin instance.

The LCEVC OMX plugin instance contains the DIL for LCEVC decoding and also creates an internal base layer OMX decoder instance (AVC/HEVC), and creates a set of unprotected source buffers to receive the incoming encrypted source stream. The LCEVC OMX plugin creates set of protected OMX input/output buffers to handle decrypted data. These may be referred to as secured buffers.

After the protected buffers have been created, the playout session can then start the decoding process. In the decoding process, the ExoPlayer performs demux on the incoming video stream, which may be an MPEG 2 TS or MP4 file for example. Then, the ExoPlayer passes the encrypted stream to MediaCodec. This stream contains both the encrypted base video data and the unencrypted LCEVC video data. It is worth noting that LCEVC data is typically sent in SEI NALUs, but could also be a different NALU stream.

In alternative implementations the LCEVC video data may be encrypted, see for example, the European patent publication EP 3417629, which is incorporated herein by reference in its entirety.

After receiving the encrypted stream, MediaCodec will then perform DRM decryption by writing the encrypted stream to one or more unprotected source buffers, and passing the source buffer and a protected OMX input buffer to the crypto block. The crypto block then decrypts the unprotected source buffer into the protected OMX input buffer.

In this way there is a separation of decryption and base decoding, e.g. with the LCEVC OMX component as an intermediary. With a single input video stream, one would consider combining decryption and decoding. However, by separating decryption and encoding, it is ensured that protected content is not exposed to unprotected resources that could make copies of, or otherwise compromise, the security of the protected content.

MediaCodec will then decode the video by passing the protected OMX input buffer to the LCEVC OMX plugin to allow the base layer to be decoded. This is done using the internal base decoder instance of the LCEVC OMX plugin.

The unprotected source buffer, which still includes the encrypted video signal is also passed to the LCEVC OMX plugin to allow the enhancement layer to be decoded using its internal DIL instance. The DIL uses the CPU for decoding. Since the CPU cannot access the contents of a protected buffer, it is preferably given the original unprotected source buffer as input. This does not expose the protected content to unprotected resources and the base video signal is still encrypted and the LCEVC data is not encrypted.

Once the base and enhancement layer data are passed to the LCEVC OMX plugin decoders, the frame decode can be executed using the standard DIL OpenGL Pipeline.

ExoPlayer will receive a callback when the enhanced DILImage is ready and can then render the frame. A DILImage is a class used in the DIL to carry a frame or field of video. The DILImage carries the data as an array of buffer/texture/hardwarebuffer, according to the colour format, and also carries various metadata, for example colour information, rotation and sample aspect ratio.

The proposed framework may modify the Android media framework to allow both encrypted and decrypted video to be passed to the LCEVC OMX plugin. This may require changes to the Android MediaCodec and OMX frameworks. However, these changes are intended to be minimal, to encourage integrators to adopt them. Making small but effective changes is preferable in this context as custom patches to standard Android frameworks, such as the proposed MediaCodec and OMX frameworks, increase the long-term support workload for integrators.

A solution may require ExoPlayer to join the payload of the two tracks into one NALU stream, effectively converting the dual tracks to a single track, with LCEVC data in SEI.

The following sets out implementation details of enhancement encoding, such as LCEVC enhancement encoding performed on an Android-based device. Similar implementations are contemplated on other devices but an example is provided in the form of ExoPlayer on an Android device.

Figure 9:
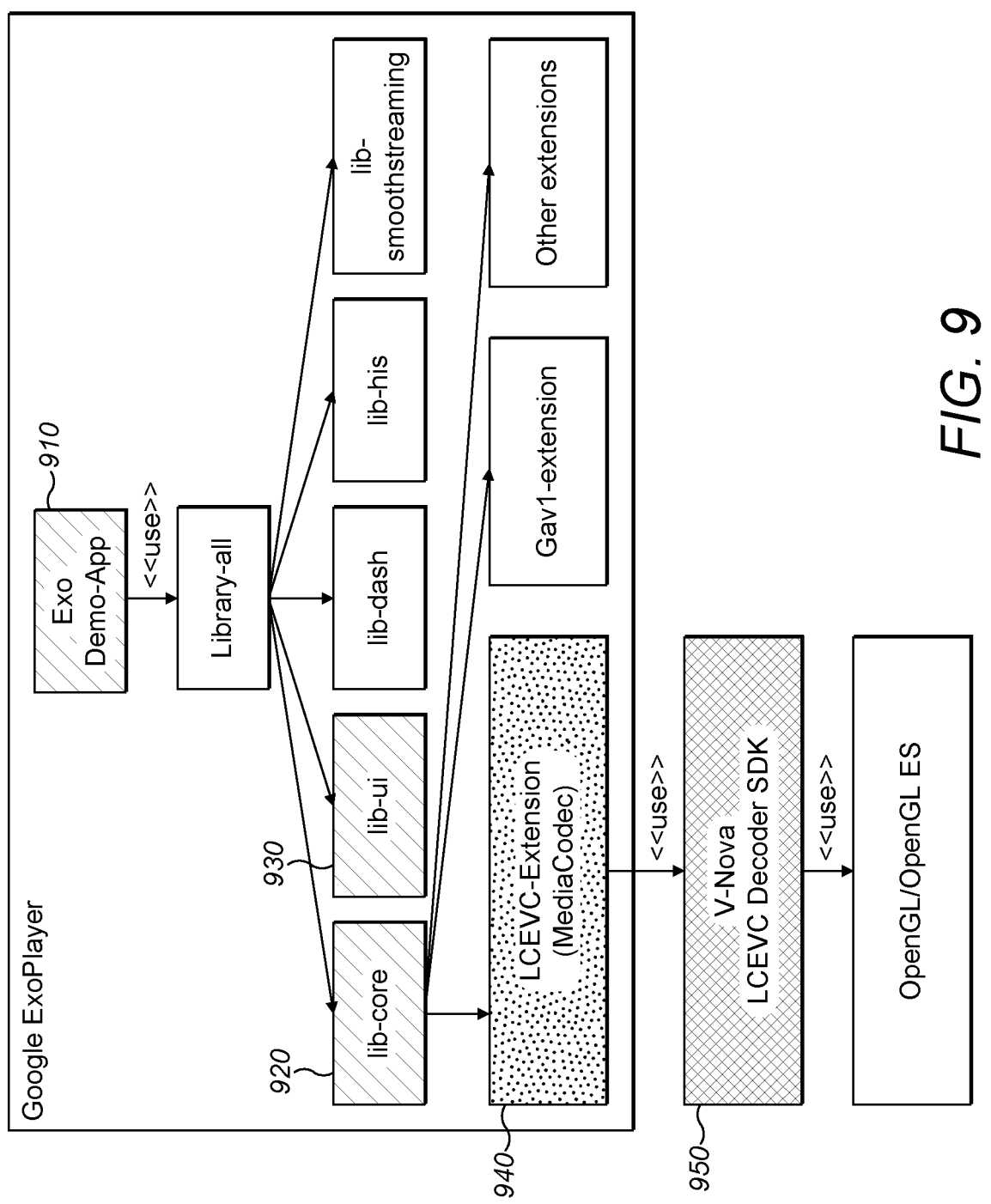
FIG. 9 illustrates a high-level architecture of an Android solution.

FIG. 9 illustrates a high-level architecture of an Android solution. FIG. 9 shows how the LCEVC extension 940 may be integrated into Google ExoPlayer and interface with an LCEVC decoder 950.

To achieve LCEVC integration in Google ExoPlayer, Exo Demo-App block 910, lib-core block 920 and lib-ui block 930 are modified, as indicated by the hatching shown in the drawing. The Exo components are modified by V-Nova. The LCEVC-Extension block 940 is added by V-Nova. The V-Nova LCEVC Decoder SDK 950 is owned by V-Nova. The Library-all, lib-dash, lib-his, lib-smoothstreaming, Gav1 extension and other extensions of ExoPlayer are not modified. That is, those are standard ExoPlayer components. Similarly, the OpenGL/OpenGL ES component is a standard Android component, and does not required modification.

Due to the nature of LCEVC, one can achieve higher quality stream playback than native codec on general Android devices. However, when the LCEVC enhancement is decoded and applied in software using the CPU and GPU resources available on the device one may encounter performance issues when decoding high bitrate or high framerate streams on low-end devices.

Another issue is that the LCEVC-extension may work on certain devices due to Android fragmentation. Some manufacturers make Android OS skins which do not fully implement the Open GL/EGL extensions required by the optimised implementation of LCEVC extension.

Yet another issue is achieving secure LCEVC playback on devices with different security schemes. A security scheme determines how the device behaves in certain scenarios, for example how to securely provide playback when the content is marked as premium content. A security scheme is set by a DRM vendor. For example, the Widevine security levels are a specific example of a security scheme, and a device's ability to perform LCEVC playback securely may be dependent on the Widevine security level of the device. It is to be understood that a Widevine security level is interchangeable with another kind of security scheme, and that the Widevine levels are used here for ease of description.

Before discussing Widevine DRM support challenges, below is an overview of Widevine DRM Security Level Definitions. There are three Widevine DRM security levels: Security Level 1, Security Level 2, and Security Level 3. These may also be referred to as Widevine L1, Widevine L2 and Widevine L3 respectively.

Security level 1 is the highest level of security. According to this level, all content processing, cryptography, and control is performed within the Trusted Execution Environment (TEE). In some implementation models, security processing may be performed in different chips.

Security level 2 is an intermediate security level. According to this level, cryptography, but not video processing, is performed within the TEE; decrypted buffers are returned to the application domain and processed through separate video hardware or software. At level 2, however, cryptographic information is still processed only within the trusted execution environment.

Security level 3 is the lowest security level. Devices having a security level of 3 do not have a TEE on the device. Appropriate measures may be taken to protect the cryptographic information and decrypted content on host operating system. A Level 3 implementation may also include a hardware cryptographic engine, but that only enhances performance, not security.

The difficulty with providing an LCEVC-ExoPlayer solution with encrypted stream playback, is that device playback requirements for the highest security devices, i.e. Secure Level 1 devices are different to device requirements for lowest security devices, i.e. Secure Level 3 devices. This is explained in more detail below.

For the LCEVC extension to be able to enhance and playback Secure Level 1 devices, the OpenGL EGL and GLES extensions need to be present and supported by the device.

In contrast, on Secure Level 3 devices, the LCEVC extension does not need to use these OpenGL extensions.

Due to the above, there may be challenges when attempting to provide general DRM support because some Secure Level 1 devices don't support the needed EGL extensions. Another challenge is that some Secure Level 1 devices do support the required EGL extensions however the extensions implementation is not fully compatible with EGL specification. This is a general Android issue as implementation is up to OEMs. On these devices playback of DRM protected stream can crash the app or the Android OS when LCEVC-ExoPlayer is trying to use these extensions.

The present application seeks to provide a solution to the above mentioned issues. A solution should allow a user to be able to view video on any Android device no matter if the video is clear stream or DRM protected stream. In order to ensure video playback on all devices a "fall-back" solution has been designed. At a high-level, according to the fall-back solution, if a device is identified as a problematic device then, LCEVC-ExoPlayer will fall-back to vanilla ExoPlayer playback, which means only base video will be decoded and rendered, without LCEVC enhancement data.

The fall-back solution can be configured differently for clear stream playback and DRM protected stream playback.

Figure 10:
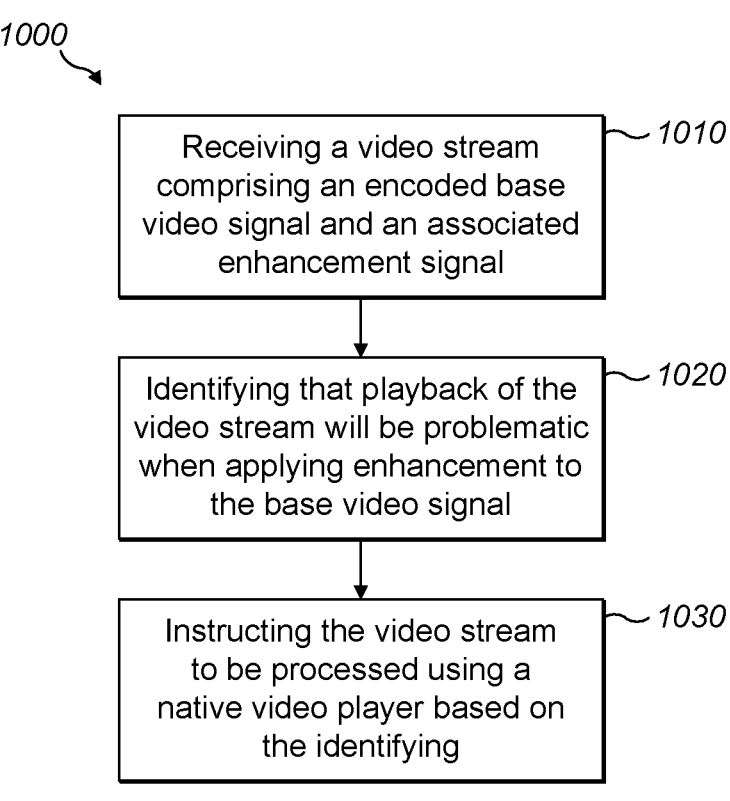
FIG. 10 illustrates a fall-back method for implementing an enhancement decoding.

FIG. 10 illustrates an exemplary fall-back solution according to the present disclosure.

An optional step 1010 comprises receiving a video stream comprising an encoded base video signal and an associated enhancement signal, wherein the enhancement signal comprises one or more layers of residual data, the one or more layers of residual data being generated based on a comparison of data derived from a decoded video signal and data derived from an original input video signal.

At step 1020, it is identified that playback of the video stream will be problematic when applying enhancement to the base video signal.

Step 1030 further comprises instructing the video stream to be processed using a native video player based on the identifying.

The fall-back method may part of the secure enhancement decoding method described with reference to FIG. 8. That is, part of the secure enhancement encoding method may include identifying if playback of the video stream will be problematic when applying enhancement to the base video signal. The identifying may be performed after the one or more source buffers are created in step 810. Accordingly, instead of processing the video stream in the secure execution space, the video stream may be processed using a native video player.

Identifying that playback of the video stream will be problematic may comprise determining if the device performing the method is mentioned in a list of problematic devices. This is explained further below.

When playing clear stream if the running Android device is in the fall-back list and "action" is configured with value "exclude" playback will fall back to vanilla ExoPlayer.

When playing a DRM protected stream, if the running Android device is in the fall-back list and "action" is configured with either "secure_exclude" or "exclude", playback will fall back to vanilla ExoPlayer playback.

However, if the Android device is not in the fall-back list, then if the device is a Secure Level 1 device and the required EGL extensions are present, then LCEVC enabled playback will happen. However, if the device is a Secure Level 1 device and the required EGL extensions are not present, playback will fall back to vanilla ExoPlayer playback. On Secure Level 3 devices, LCEVC playback will happen, regardless of the EGL extensions present or not.

The following provides an example of how the problematic list may be implemented.

JSON format may be used in examples to list the problematic device. This is how an example JSON list may look:

```
{
    "device-model" : [
        {
            "api" : 21
            "action": "secure_exclude"
            "reason": "extensions"
        },
        {
            "api" : 22
            "action": "secure_exclude"
            "reason": "extensions"
        }
    ]...
}
```

The following table sets out example JSON fields in an implementation.

| Field | Value | An example |
|---|---|---|
| device-model | device model string as reported by the system property "ro.product.model" | "SM-A326B" for Samsung Galaxy A32 5G |
| api | Android API (e.g., 26 for "Oreo" Android 8) as reported by the system property "ro.build.version.sdk". Note: if "api" is not set, or set to 0, it will be regarded as any api matching the "device-model". | 30 for Android 11. |

-continued

| Field | Value | An example |
|---|---|---|
| action | Fallback operations with available values: "exclude": fallback to vanilla ExoPlayer playback for both clear and DRM protected content; "secure_exclude": fallback to vanilla ExoPlayer playback only for DRM protected content; | "exclude" or "secure_exclude" |
| reason | A descriptive text for logging or reporting. It is an optional field. | This is a faulty device |

The following sets out examples of the above fall-back solution in the context of integration with the above-described aspects of the DIL. The DIL may be distributed as a native binary which can be integrated within the target environment.

The DIL may include some basic checks on start-up, which include checking the OpenGL/GLES version and checking that the JSON configuration is parse-able. If any errors arise during the checks, this may cause an exit. The DIL may ignore any variables that are not recognised.

Importantly, the DIL can be queried to confirm that the device is secure. The EGL and GL protected extensions (EGL_PROTECTED_CONTENT and GL_PROTECTED_TEXTURE) may be checked to ensure they are present and supported. The chipset and driver versions may be checked against a blacklist of known non-secure GPUs.

If any of the checks fail, the device may be considered non-secure. The DIL caller can use this information to decide what to do. The DPI (decoder plug-ins, described above) includes some mitigations against invalid streams.

For example, the LCEVC bitstream syntax may be parsed to ensure that at no point the process reads data out of bounds of the submitted LCEVC stream. For example, where reported sizes are out of bounds of the sub-block of LCEVC data. The DPI may also verify LCEVC bitstream configuration parameters for validity against the latest LCEVC standard, or may ensure during LCEVC residual decoding that reads/writes are not out of bounds of the memory intended to be modified as a result of incorrect compressed data. Several checks on coordinates where final LCEVC data may be written may be performed. Similar checks may ensure that reads are not out of bounds of the compressed sub-block of LCEVC data, should the LCEVC data be invalid.

In a further implementation example, there may be provided an extension to an existing or native playback client or application, for example ExoPlayer. ExoPlayer may be extended to support LCEVC video on standard Android devices.

ExoPlayer software codec extension for LCEVC may be provided. This integrates using the same ExoPlayer extension mechanism as other software codecs such as VP-9 or AV-1. When ExoPlayer is presented with a new playback URL, it checks all its extensions in a specific order to find a codec to decode a stream. Each extension has the opportunity to reject a stream, for example if security requirements cannot be met. If the LCEVC extension accepts a stream, it uses the existing MediaCodec capability to decode the base layer, which in turn uses the Android OMX framework and built-in codecs, and uses the DIL to provide the LCEVC enhancement.

If the ExoPlayer extension detects that the device supports Widevine Level 1 and the stream is DRM protected, the extension may check that the device is suitable for secure playback.

The extension may include a device blacklist. Specific device and OS version combinations can be configured to deny secure LCEVC decode, or any LCEVC decode. The extension may query the DIL to confirm that the device is secure. If the device is blacklisted or the DIL considers the device non-secure, then the extension may fall-back to base decoding only.

Clauses

The disclosure may be further understood with reference to the following clauses.

1. A method of implementing enhancement decoding, comprising:
 receiving a video stream comprising an encoded base video signal and an associated enhancement signal, wherein the enhancement signal comprising one or more layers of residual data, the one or more layers of residual data being generated based on a comparison of data derived from a decoded video signal and data derived from an original input video signal;
 identifying playback of the video stream will be problematic when applying enhancement to the base video signal; and
 instructing the video stream to be processed using a native video player based on the identifying.

2. A method according to clause 1, further comprising processing the video stream using an enhancement decoder based on identifying playback of the video stream will not be problematic.

3. A method according to any of clauses 1 or 2 in which the step of identifying problematic playback comprises:
 retrieving details of the device performing the method, comparing the details to a predetermined list of details of problematic devices and identifying playback of the video stream will be problematic if the retrieved details correspond to details in the list.

4. A method according to any of clauses 1 to 3, in which the base video signal is an encrypted base video signal.

5. A method according to any of clauses 1 to 4 in which the step of identifying problematic playback comprises:
 identifying if certain EGL extensions are present and/or supported, such that if certain EGL extensions are not present, the method comprises instructing the video stream to be processed using a native video player.

6. A method according to any of clauses 1 to 5 in which the step of identifying problematic playback comprises:

identifying if a TEE is present on a device performing the method.

7. A method according to any of clauses 1 to 6 in which the step of identifying problematic playback comprises:

identifying if a hardware cryptographic engine is present on the device performing the method.

8. A method according to any of clauses 1 to 7 in which the step of identifying problematic playback comprises:

identifying a security level of a device performing the method according to Widevine DRM Security Level Definitions.

9. A method according to clause 8, wherein on a secure level 3 device, the method comprises processing the video stream using an enhancement decoder.

10. A method according to any of clauses 1 to 9, wherein the step of identifying problematic playback comprises:

identifying if the base video signal is an encrypted base video signal, if the base video signal is not an encrypted base video signal:

retrieving details of the device performing the method, comparing the details to a predetermined list of details of problematic devices and identifying playback of the video stream will be problematic if the retrieved details correspond to details in the list; and processing the video stream using an enhancement decoder if the retrieved details do not correspond to details in the list, if the base video signal is an encrypted base video signal:

retrieving details of the device performing the method, comparing the details to a predetermined list of details of problematic devices and identifying playback of the video stream will be problematic if the retrieved details correspond to details in the list; and if the retrieved details do not correspond to details in the list, identifying if a TEE is present on a device performing the method and if a TEE is not present, processing the video stream using an enhancement decoder, else if a TEE is present:

identifying if certain EGL extensions are present and/or supported and if certain EGL extensions are present and/or supported:

processing the video stream using an enhancement decoder, else if certain EGL extensions are not present and/or supported, instructing the video stream to be processed using a native video player.

The invention claimed is:

1. A method of implementing an enhancement decoding, said method comprising:

storing an encoded video stream in one or more source buffers, the encoded video stream comprising an encrypted base video signal and an enhancement video signal, wherein the one or more source buffers are provisioned outside of a secure execution space;

causing a decryption module to decrypt the encrypted base video signal, resulting in generation of a decrypted base video signal;

causing the decryption module to store the decrypted base video signal in one or more protected input buffers, wherein the one or more protected input buffers are provisioned inside of the secure execution space;

causing a base decoder to decode the decrypted base video signal, resulting in generation of a decoded base video signal, wherein the base decoder is implemented within the secure execution space;

storing the decoded base video signal in one or more protected output buffers, wherein the one or more protected output buffers are also provisioned inside of the secure execution space;

causing an enhancement decoder to decode the enhancement video signal, resulting in generation of a decoded enhancement video signal, wherein the enhancement decoder is implemented within the secure execution space;

storing the decoded enhancement video signal in the one or more protected output buffers; and combining, in the secure execution space, the decoded enhancement video signal with the decoded base video signal, resulting in generation of a combined signal, such that the combined signal is generated only within the secure execution space.

2. The method according to claim 1, wherein the enhancement video signal is an encoded signal comprising one or more layers of residual data, the one or more layers of residual data being generated based on a comparison of data derived from a decoded video signal and data derived from an original input video signal.

3. The method according to claim 1, wherein the method further includes setting a protected content flag on the one or more protected output buffers.

4. The method according to claim 1, wherein the one or more source buffers are unprotected source buffers.

5. The method according to claim 1, wherein the enhancement video signal is an unencrypted enhancement video signal.

6. The method according to claim 5, wherein the unencrypted enhancement video signal is stored in supplemental enhancement information network abstraction layer units (SEI NALUs).

7. The method according to claim 1, wherein the base decoder is a native base decoder.

8. The method according to claim 1, wherein the secure execution space is an instance of a secure plugin.

9. The method according to claim 8, wherein the secure plugin is an open media acceleration, OMX, plugin.

10. The method according to claim 1, wherein the secure execution space provides a wrapper for a base decoding layer and an instance of the enhancement decoder.

11. The method according to claim 10, wherein the enhancement decoder is provided by an instance of a decoder integration layer to control operation of the enhancement decoder.

12. The method according to claim 10, wherein the enhancement decoder is implemented on a CPU to decode the enhancement signal using unprotected resources.

13. The method according to claim 10, further comprising uploading, in an environment of the decoder integration layer, the decoded enhancement video signal to a GPU for combining with the decoded base video signal on protected resources.

14. The method according to claim 13 further comprising outputting the combined signal comprising the decoded enhancement data-video signal and the decoded base video signal on an on-screen surface or preparing an enhanced frame comprising the combined signal for subsequent rendering on the on-screen surface.

15. The method according to claim 1, further comprising creating an instance of the secure execution space comprising an instance of the base decoder and an instance of a decoder integration layer comprising the enhancement decoder.

16. The method according to claim 15, wherein the enhancement decoder implements an enhancement decoding layer, and is configured to:

receive an encoded enhancement signal; and, decode the encoded enhancement signal to obtain one or more layers of residual data, the one or more layers of residual data being generated based on a comparison of data derived from a decoded video signal and data derived from an original input video signal.

17. The method according to claim 16, further comprising extracting the encoded enhancement signal from the encoded video stream to separate the encoded enhancement signal from the encrypted base video signal.

18. A computer system comprising:

one or more processors; and one or more hardware storage devices that store instructions that are executable by the one or more processors to cause the computer system to:

store an encoded video stream in one or more source buffers, the encoded video stream comprising an encrypted base video signal and an enhancement video signal, wherein the one or more source buffers are provisioned outside of a secure execution space;

cause a decryption module to decrypt the encrypted base video signal, resulting in generation of a decrypted base video signal;

cause the decryption module to store the decrypted base video signal in one or more protected input buffers, wherein the one or more protected input buffers are provisioned inside of the secure execution space;

cause a base decoder to decode the decrypted base video signal, resulting in generation of a decoded base video signal, wherein the base decoder is implemented within the secure execution space;

store the decoded base video signal in one or more protected output buffers, wherein the one or more protected output buffers are also provisioned inside of the secure execution space;

cause an enhancement decoder to decode the enhancement video signal, resulting in generation of a decoded enhancement video signal, wherein the enhancement decoder is implemented within the secure execution space;

store the decoded enhancement video signal in the one or more protected output buffers; and combine, in the secure execution space, the decoded enhancement video signal with the decoded base video signal, resulting in generation of a combined signal, such that the combined signal is generated only within the secure execution space.

19. One or more hardware storage devices that store instructions that are executable by one or more processors to cause the one or more processors to:

store an encoded video stream in one or more source buffers, the encoded video stream comprising an encrypted base video signal and an enhancement video signal, wherein the one or more source buffers are provisioned outside of a secure execution space;

cause a decryption module to decrypt the encrypted base video signal, resulting in generation of a decrypted base video signal;

cause the decryption module to store the decrypted base video signal in one or more protected input buffers, wherein the one or more protected input buffers are provisioned inside of the secure execution space;

cause a base decoder to decode the decrypted base video signal, resulting in generation of a decoded base video signal, wherein the base decoder is implemented within the secure execution space;

store the decoded base video signal in one or more protected output buffers, wherein the one or more protected output buffers are also provisioned inside of the secure execution space;

cause an enhancement decoder to decode the enhancement video signal, resulting in generation of a decoded enhancement video signal, wherein the enhancement decoder is implemented within the secure execution space;

store the decoded enhancement video signal in the one or more protected output buffers; and combine, in the secure execution space, the decoded enhancement video signal with the decoded base video signal, resulting in generation of a combined signal, such that the combined signal is generated only within the secure execution space.

\*    \*    \*    \*    \*